(12) United States Patent
Lo et al.

(10) Patent No.: US 7,457,110 B2
(45) Date of Patent: Nov. 25, 2008

(54) METHOD AND APPARATUS FOR INSTALLING A COMPONENT IN AN INFORMATION HANDLING SYSTEM

(75) Inventors: Michael Lo, Round Rock, TX (US); Brently Lynn Cooper, Hutto, TX (US); Richard Steven Mills, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 10/902,900

(22) Filed: Jul. 30, 2004

(65) Prior Publication Data

US 2006/0023413 A1 Feb. 2, 2006

(51) Int. Cl.
*G06F 1/16* (2006.01)
(52) U.S. Cl. ....................... 361/685; 361/801
(58) Field of Classification Search ................. 361/684, 361/685, 686, 725, 726, 727, 728, 732, 740, 361/741, 747, 752, 756, 759, 801, 802, 683; 174/520
See application file for complete search history.

(56) References Cited

U.S. PATENT DOCUMENTS

| | | | | |
|---|---|---|---|---|
| 4,227,237 A | * | 10/1980 | Matthews et al. | 361/797 |
| 6,798,650 B2 | * | 9/2004 | Reznikov et al. | 361/685 |
| 7,054,150 B2 | * | 5/2006 | Orriss et al. | 361/685 |
| 7,057,890 B2 | * | 6/2006 | Chang | 361/684 |
| 7,149,081 B2 | * | 12/2006 | Chen et al. | 361/685 |
| 2004/0240171 A1 | * | 12/2004 | Liao | 361/685 |
| 2004/0264121 A1 | * | 12/2004 | Orriss et al. | 361/685 |
| 2005/0073809 A1 | * | 4/2005 | Chang | 361/684 |
| 2005/0122701 A1 | * | 6/2005 | Coffey | 361/796 |
| 2006/0002075 A1 | * | 1/2006 | Wei-Chieh et al. | 361/685 |
| 2006/0023413 A1 | * | 2/2006 | Lo et al. | 361/684 |
| 2006/0075509 A1 | * | 4/2006 | Kishon | 726/34 |

* cited by examiner

*Primary Examiner*—Dean A. Reichard
*Assistant Examiner*—Abiy Getachew
(74) *Attorney, Agent, or Firm*—Haynes and Boone, LLP

(57) ABSTRACT

A component carrier apparatus is provided that includes a resilient carrier frame operable to provide a component retaining force, a chassis guide member connected to the carrier frame, and a component locating member connected to the carrier frame. The component carrier apparatus may include a height that is less than or equal to the height of a component, and may be coupled to the component without the use of a tool.

21 Claims, 20 Drawing Sheets

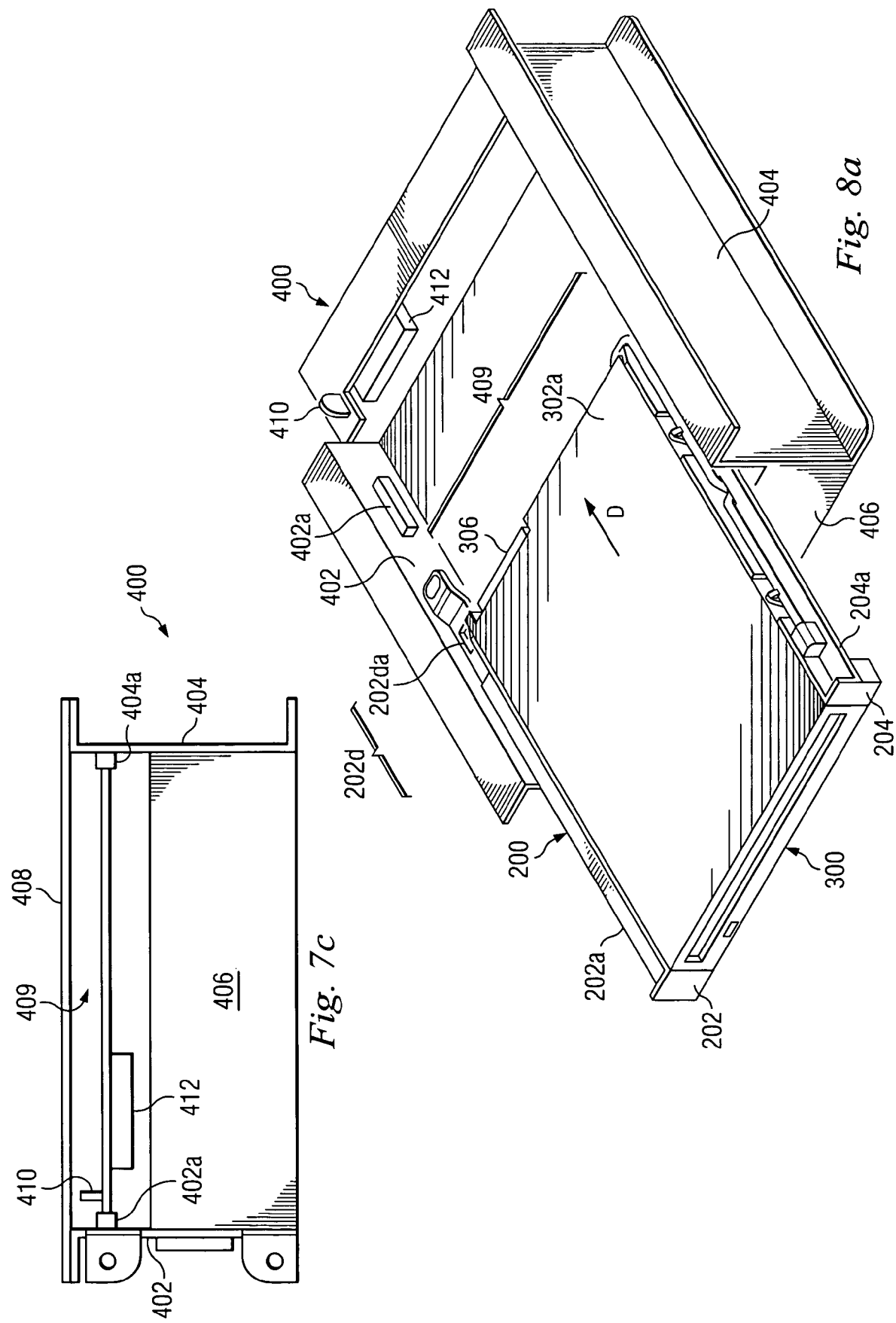

METHOD AND APPARATUS FOR INSTALLING A COMPONENT IN AN INFORMATION HANDLING SYSTEM

BACKGROUND

The present disclosure relates generally to information handling systems, and more particularly to a method and apparatus for installing a component in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include components such as floppy disk drives, compact disk drives, hard disk drives and a variety of equivalent components known in the art, which are coupled to the information handling system in order for the information handling system to access the component.

These components may be coupled to the information handling system by providing a carrier for the component which allows the component to be guided in the information handling system chassis, engaged with the information handling system, and secured in the information handling system chassis. However, the carriers require tools and mechanical fasteners to attach the carriers to the components which results in a relatively costly and time consuming assembly to provide a component that may be coupled to the information handling system. Furthermore, provisions on the carrier for the mechanical fasteners tend to provide a carrier that is relatively bulky, and attaching the carriers to the component results in a component that takes up more volume than is desirable in the limited space available in the information handling system chassis.

Accordingly, it would be desirable to provide for installing a component in an information handling system absent the disadvantages found in the prior methods discussed above.

SUMMARY

According to one embodiment, installing a component in an information handling system is accomplished by providing a resilient carrier frame operable to provide a component retaining force, a chassis guide member connected to the carrier frame, and a component locating member connected to the carrier frame.

A principal advantage of this embodiment is that a carrier apparatus for installing a component in an information handling system may be coupled to the component without the use of a tool while taking up relatively little space in the information handling system when the component is installed in the information handling system.

BRIEF DESCRIPTION OF THE DRAWINGS

FIG. 3b is a rear perspective view illustrating an embodiment of the carrier frame of FIG. 3a.

FIG. 3c is a bottom perspective view illustrating an embodiment of the carrier frame of FIG. 3a.

FIG. 4a is a front perspective view illustrating an embodiment of a component used with the carrier frame of FIG. 3a.

FIG. 4b is a rear perspective view illustrating an embodiment of the component of FIG. 4a.

FIG. 5a is a perspective view illustrating an embodiment of an assembly of the resilient member of FIG. 2 with the carrier frame of FIG. 3a.

FIG. 7c is a front view illustrating an embodiment of the chassis of FIG. 7a.

FIG. 8a is a perspective view illustrating an embodiment of an assembly of the component, carrier frame, and resilient member of FIG. 6b with the chassis of FIG. 7a.

FIG. 10b is a rear perspective view illustrating an embodiment of the carrier frame of FIG. 10a.

FIG. 10c is a bottom perspective view illustrating an embodiment of the carrier frame of FIG. 10a.

FIG. 11 is a perspective view illustrating an embodiment of a connection adapter used with the carrier frame of FIG. 10a.

FIG. 12a is a front perspective view illustrating an embodiment of a component used with the carrier frame of FIG. 10a.

FIG. 12b is a rear perspective view illustrating an embodiment of the component of FIG. 12a.

FIG. 12c is a side view illustrating an embodiment of the component of FIG. 12a.

FIG. 16a is a perspective view illustrating an embodiment of an assembly of the component, carrier frame, resilient member, and connection adapter of FIG. 14b with the chassis of FIG. 15a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
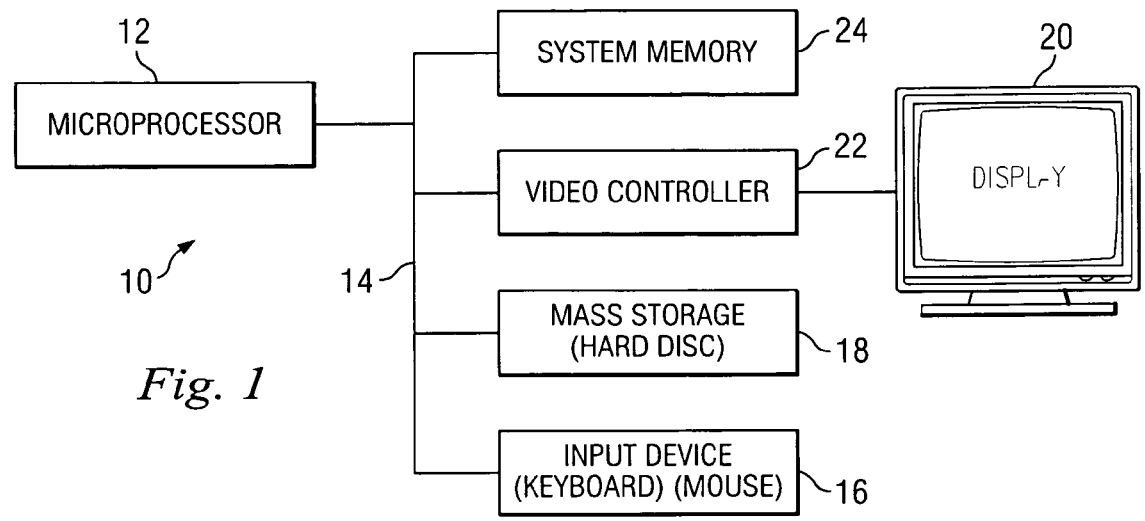
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
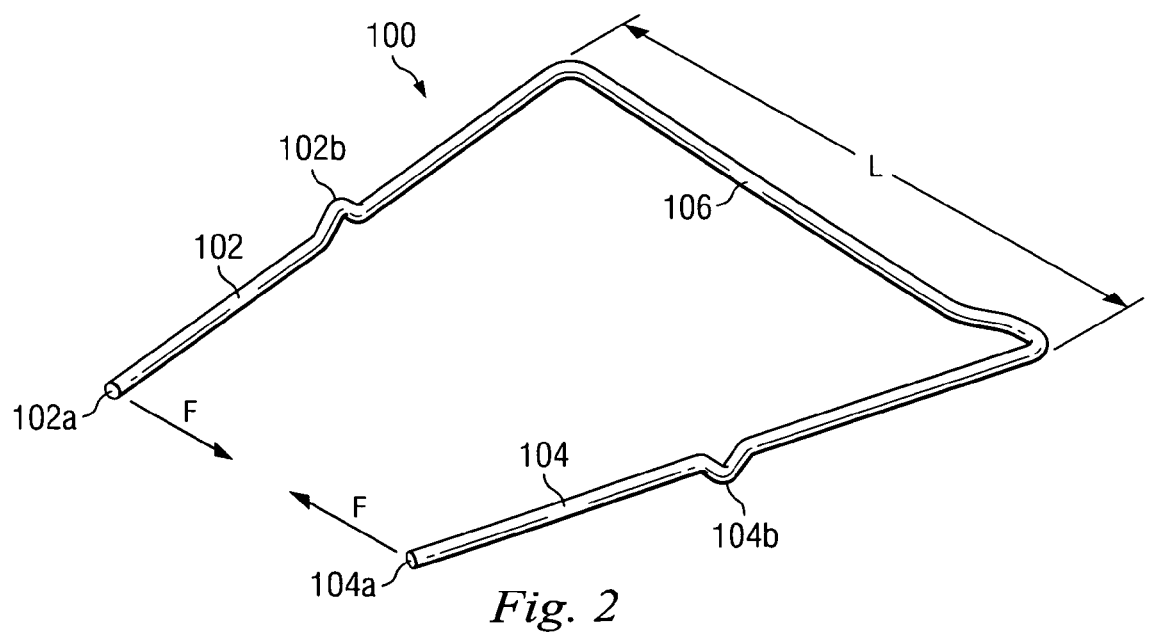
FIG. 2 is a perspective view illustrating an embodiment of a resilient member.

Referring now to FIG. 2, a resilient member 100 includes a plurality of arms 102 and 104 which are spaced apart and coupled together by a base 106 with length L. Arm 102 includes a distal end 102a opposite the base 106 and a chassis securing portion 102b situated between the base 106 and the distal end 102a. Arm 104 includes a distal end 104a opposite the base 106 and a chassis securing portion 104b situated between the base 106 and the distal end 104a. The distance between distal arms 102a and 104a is less than the length L of the base 106 such that when arms 102 and 104 are urged parallel to each other, arms 102 and 104 may provide a component retaining force F directed towards each other.

Figure 3A:
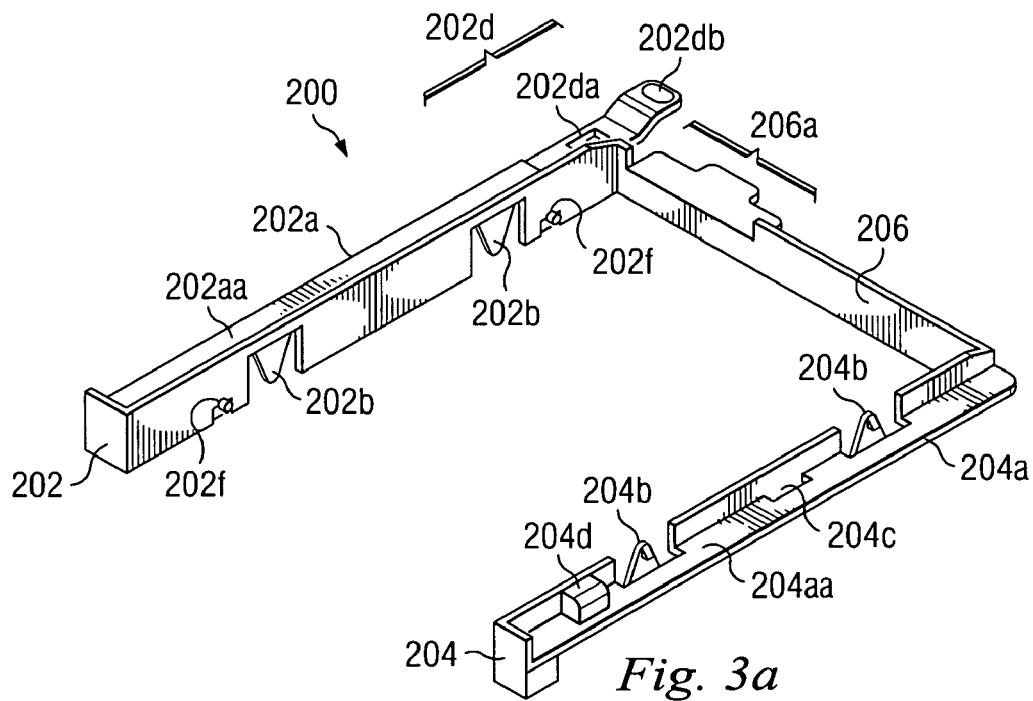
FIG. 3a is a front perspective view illustrating an embodiment of a carrier frame used with the resilient member of FIG. 2.
Figure 3B:
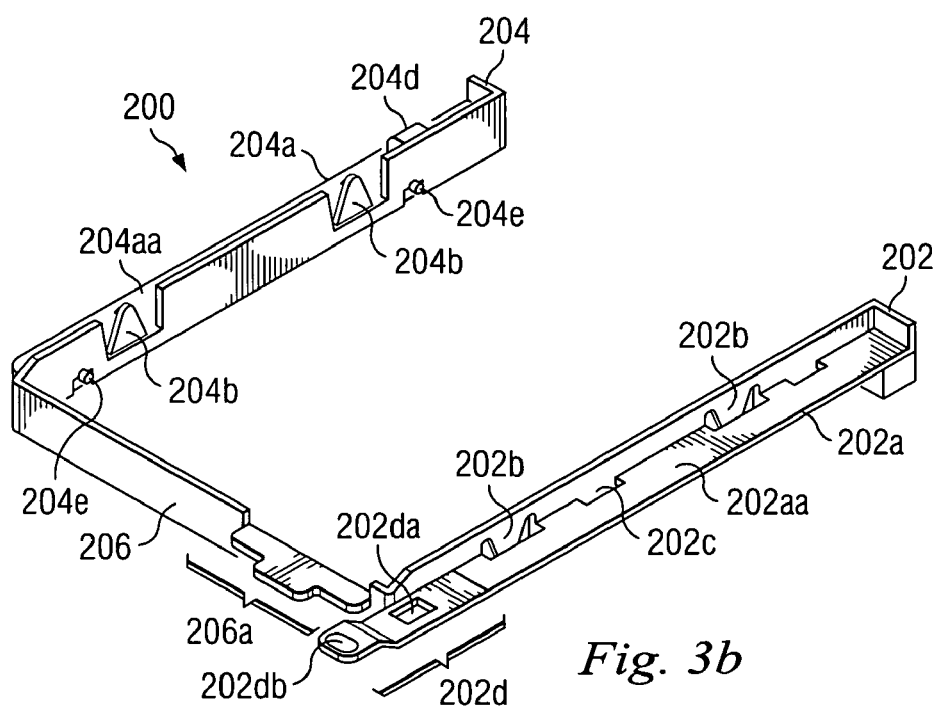
Figure 3C:
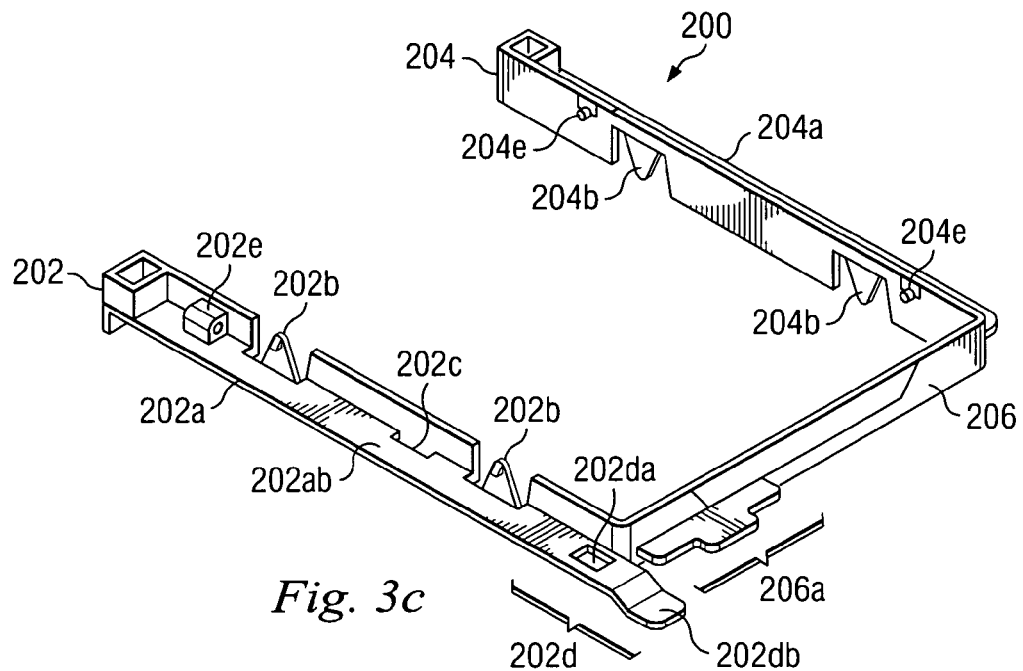

Referring now to FIGS. 3a, 3b, and 3c, a carrier frame 200 includes a plurality of arms 202 and 204 spaced apart substantially parallel to each other and coupled together by a base 206. A component channel is defined between the arms 202 and 204 and the base 206. The base 206 defines a connector channel 206a adjacent arm 202. Arm 202 includes a chassis guide member 202a situated along its length. The chassis guide member 202a includes a top surface 202aa and a bottom surface 202ab opposite the top surface 202aa. A plurality of resilient member retaining clips 202b extend from arm 202 and are situated adjacent the bottom surface 202ab of chassis guide member 202a. Arm 202 defines a resilient member mounting hole 202c situated between the plurality of resilient member retaining clips 202b and extending from the top surface 202aa to the bottom surface 202ab of chassis guide member 202a. A latch 202d extends from arm 202 and out past base 206 and defines a latching hole 202da and includes a release handle 202db. A resilient member securing member 202e is situated on bottom surface 202ab of arm 202 and on the end of arm 202 opposite the latch 202d. A plurality of component locating pegs 202f extend from arm 202 and towards arm 204.

Arm 204 includes a chassis guide member 204a situated along its length. The chassis guide member 204a includes a top surface 204aa. A plurality of resilient member retaining clips 204b extend from arm 204 and are situated adjacent the top surface 204aa of chassis guide member 204a. Arm 204 defines a resilient member mounting hole 204c situated between the plurality of resilient member retaining clips 204b and extending through chassis guide member 204a. A resilient member securing member 204d is situated on top surface 204aa of arm 204. A plurality of component locating pegs 204e extend from arm 204.

Figure 4A:
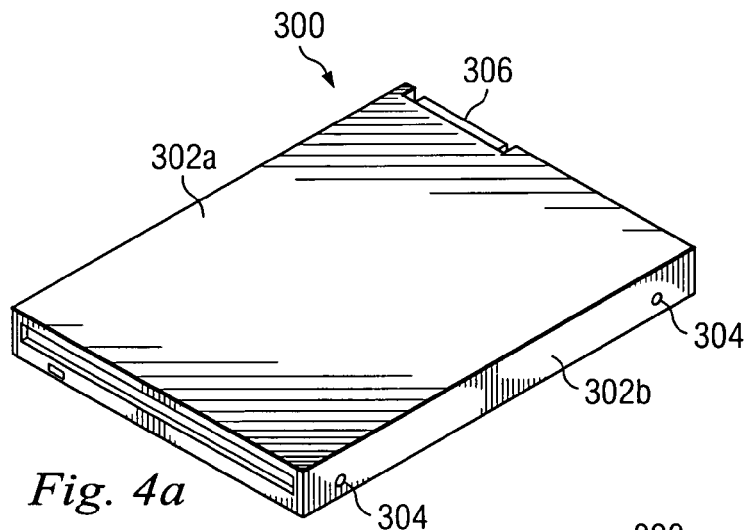
Figure 4B:
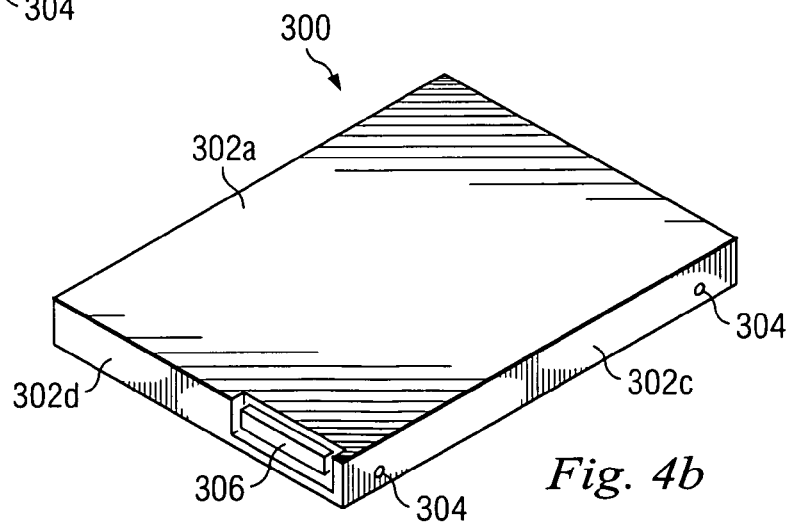
Figure 5A:
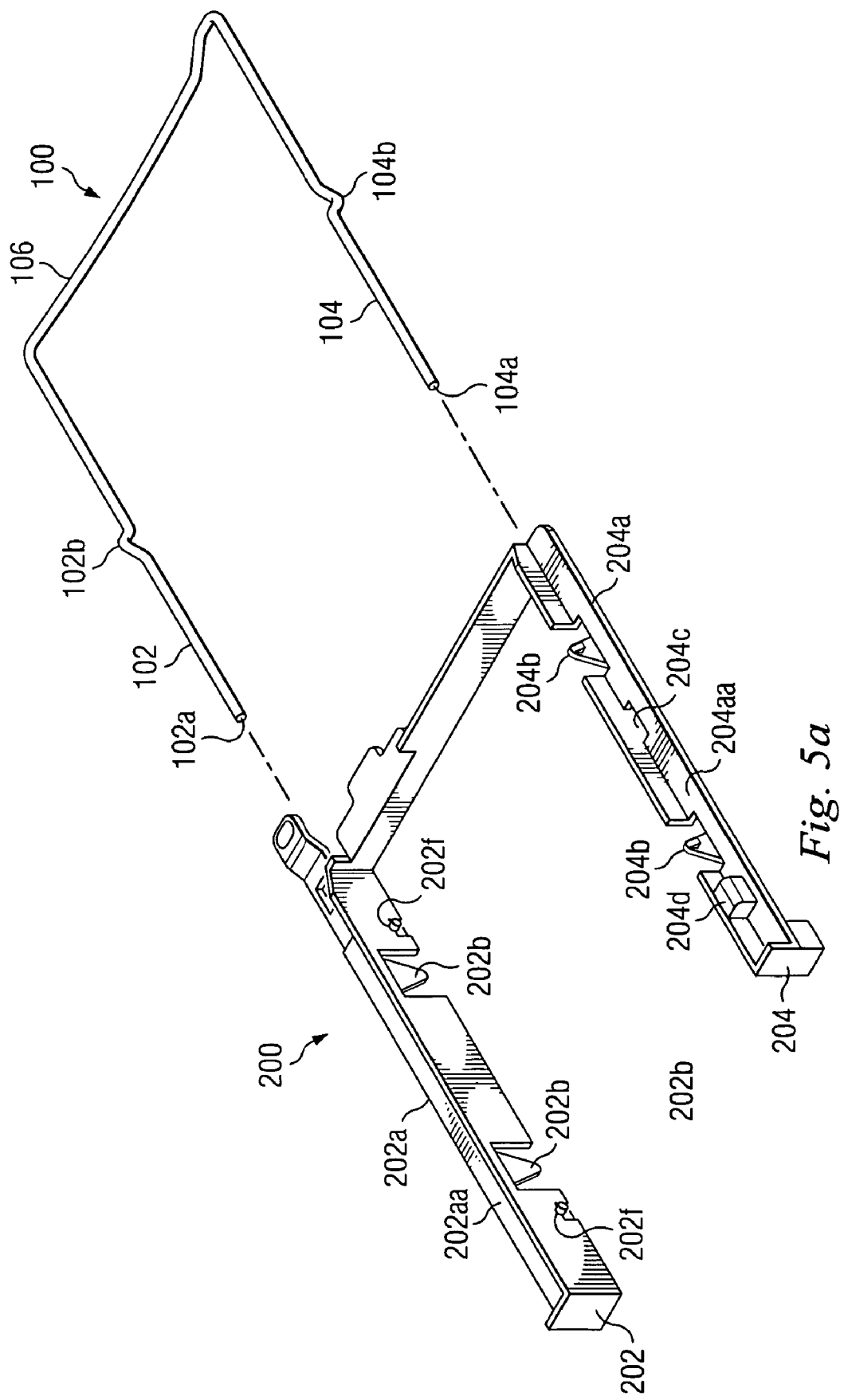
Figure 5B:
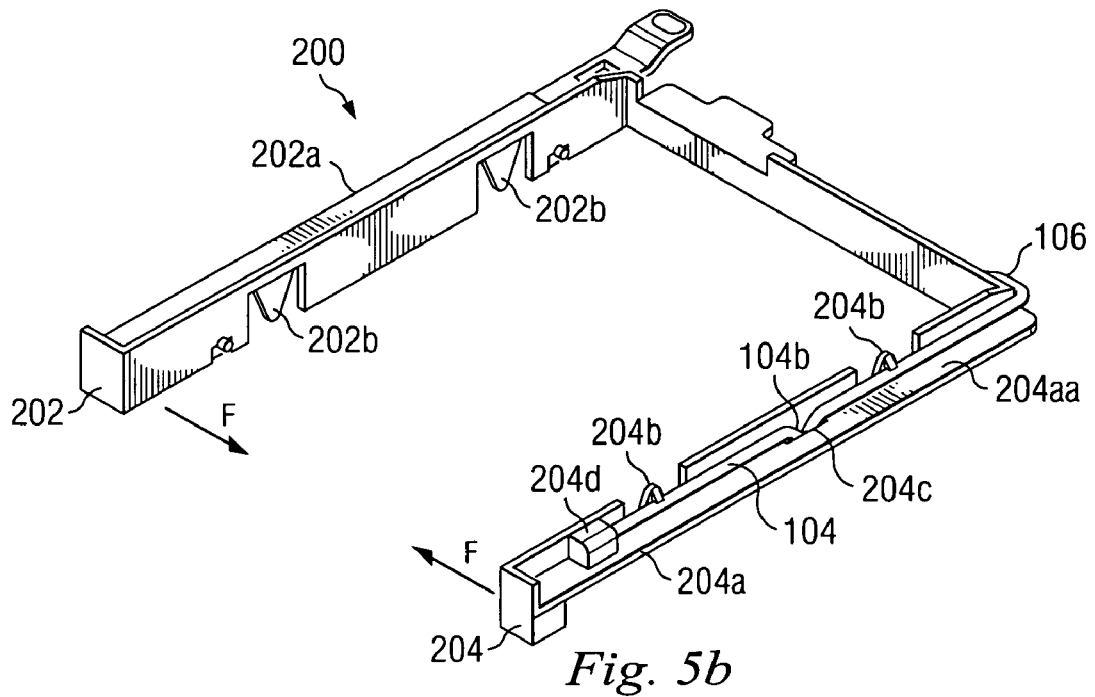
FIG. 5b is a front perspective view illustrating an embodiment of the resilient member of FIG. 2 and the carrier frame of FIG. 3a assembled.
Figure 5C:
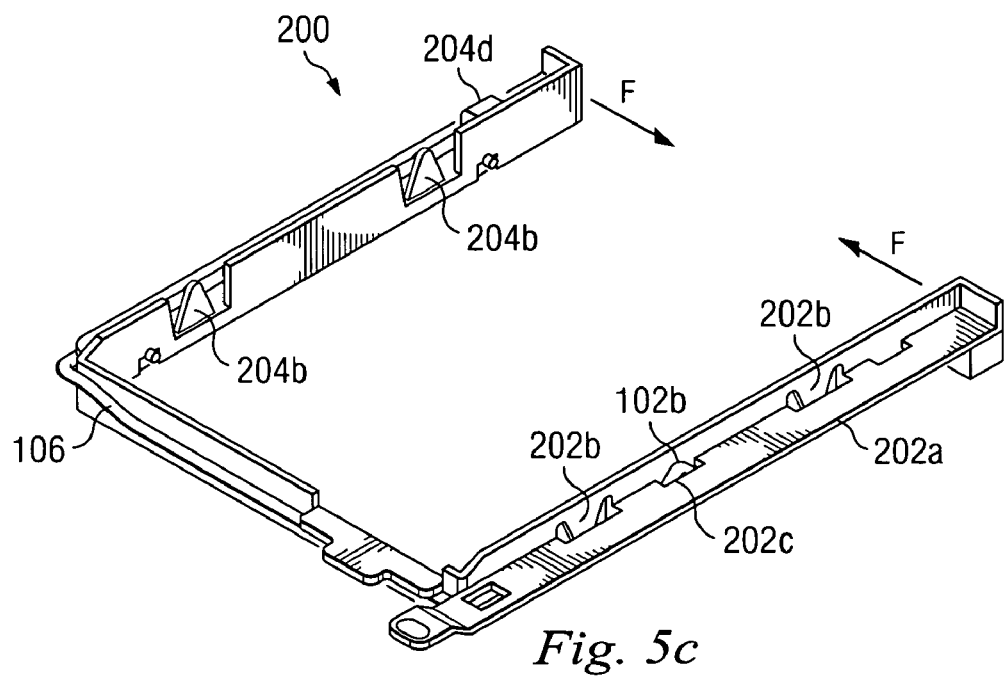
FIG. 5c is a rear perspective view illustrating an embodiment the resilient member of FIG. 2 and the carrier frame of FIG. 3a assembled.
Figure 5D:
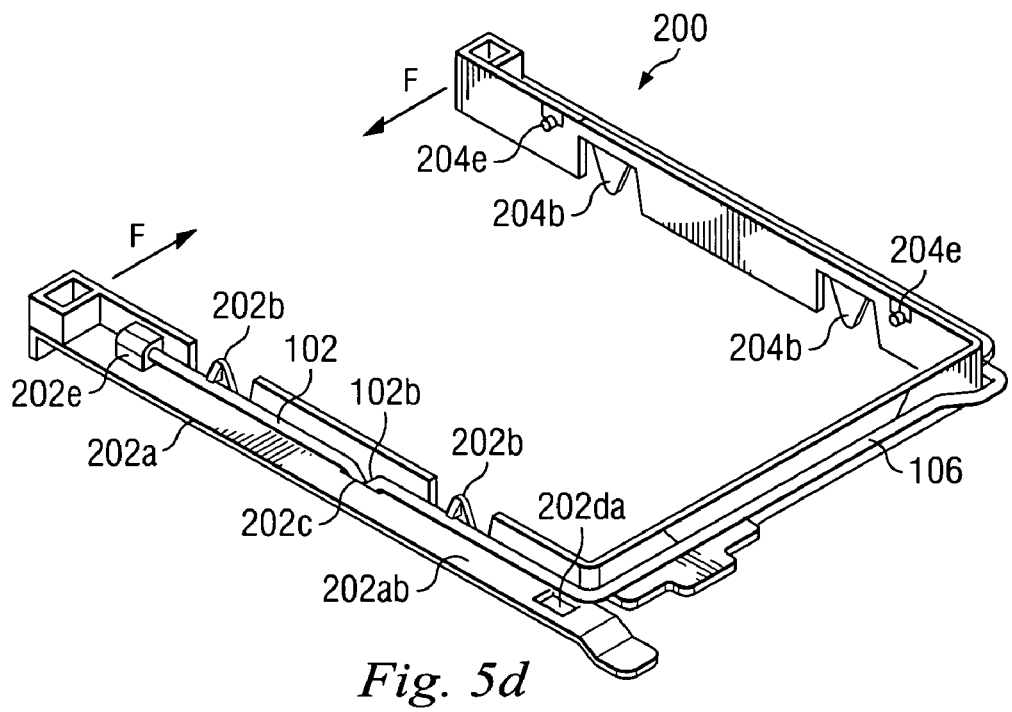
FIG. 5d is a bottom perspective view illustrating an embodiment the resilient member of FIG. 2 and the carrier frame of FIG. 3a assembled.
Figure 6B:
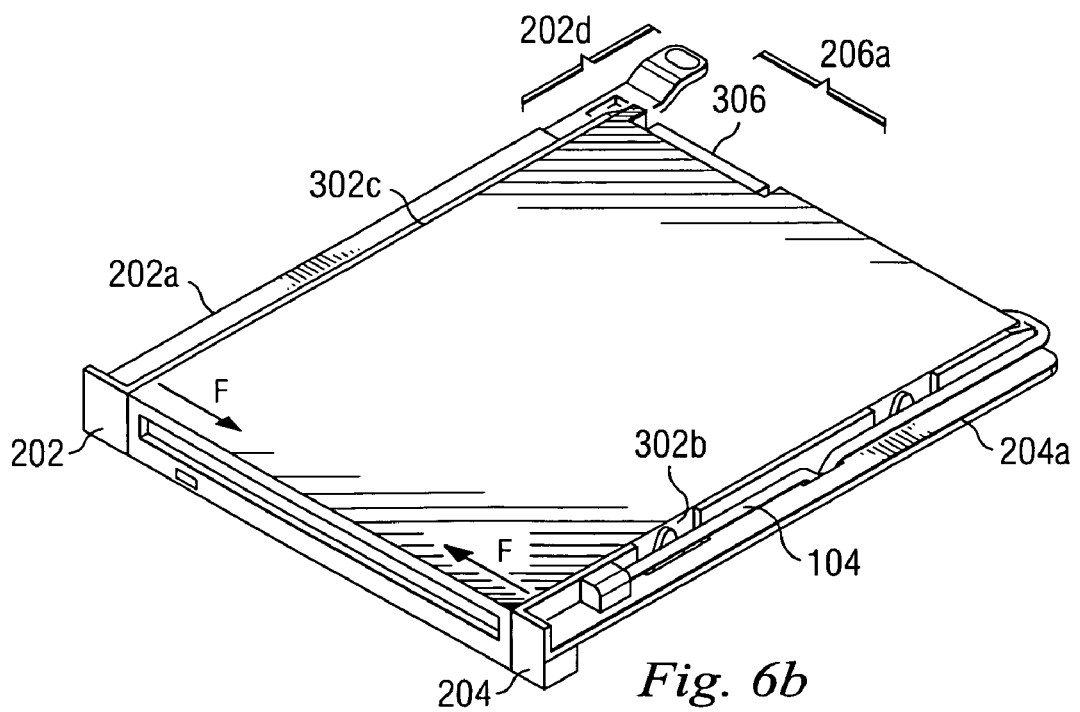
FIG. 6b is a perspective view illustrating an embodiment of the component of FIG. 4a and the assembled resilient member and carrier frame of FIG. 5b assembled.
Figure 6A:
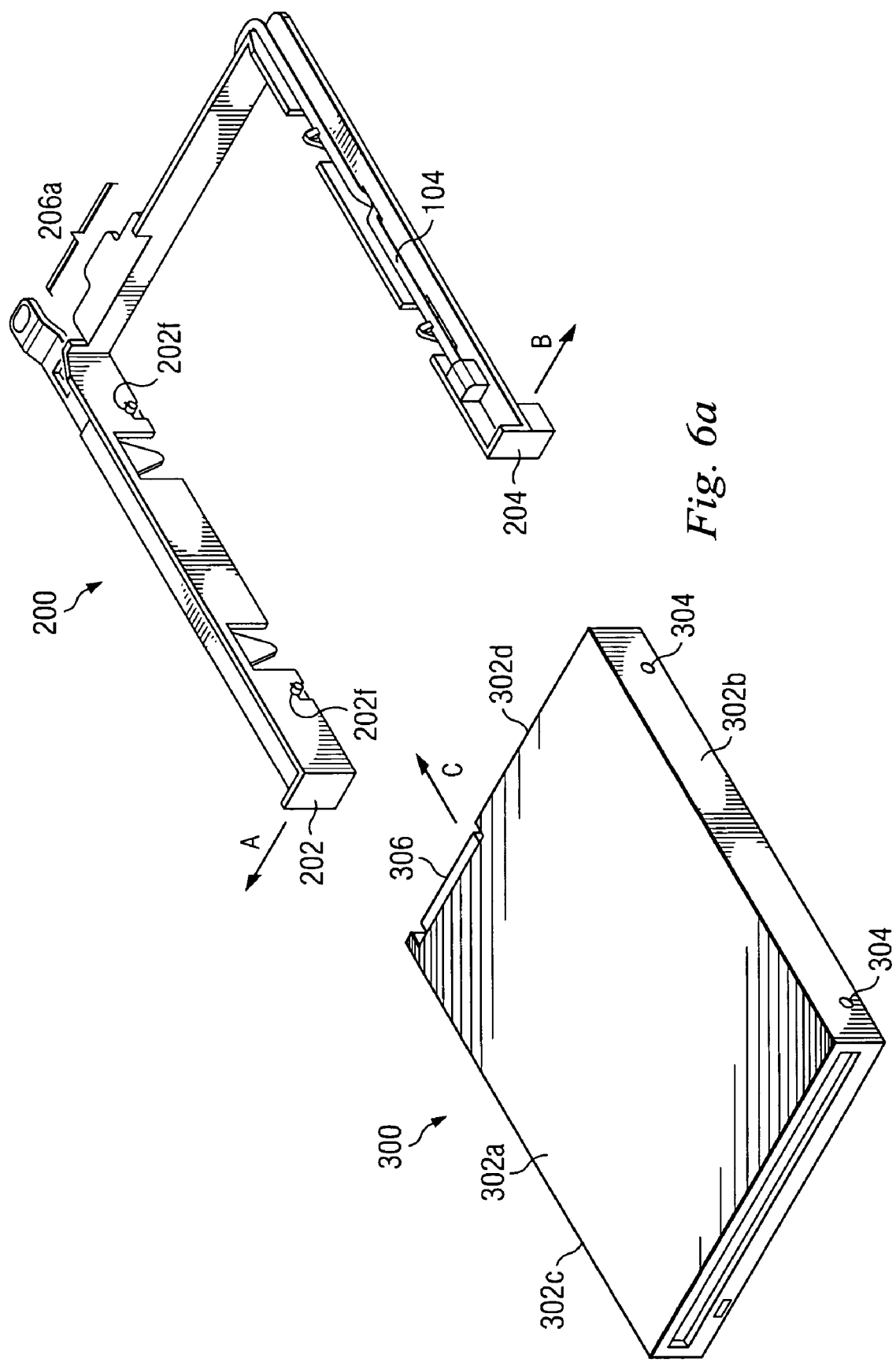
FIG. 6a is a perspective view illustrating an embodiment of the assembly of the component of FIG. 4a and the assembled resilient member and carrier frame of FIG. 5b.

Referring now to FIGS. 4a and 4b, a component 300 includes a top surface 302a, a side surface 302b, and a side surface 302c, and a rear surface 302d. In an embodiment, the side surfaces 302b and 302c are a portion of a perimeter surface of the component 300. The component 300 defines a plurality of locating holes 304 situated on opposites ends of both side surfaces 302b and 302c. A connector 306 is situated on rear surface 302d. In an exemplary embodiment, the component 300 may be a floppy disk drive, hard disk drive, or other equivalent drives known in the art.

Referring now to FIGS. 5a, 5b, 5c, and 5d, in apparatus assembly operation, arms 102 and 104 on resilient member 100 are urged parallel to each other and resilient member 100 is brought towards carrier frame 200. Arm 102 on resilient member 100 is lined up with arm 202 on carrier frame 200, and arm 104 on resilient member 100 is lined up with arm 204 on carrier frame 200. Arm 102 is then situated adjacent bottom surface 202ab of chassis guide member 202a and arm 104 is situated adjacent top surface 204aa on chassis guide member 204a and the resilient member 100 is engaged with the carrier frame 200 such that distal end 102a of arm 102 is secured in resilient member securing member 202e and distal end 104a of arm 104 is secured in resilient member securing member 204d. With distal members 102a and 104a secured in resilient member securing members 202e and 204d, respectively, chassis securing portions 102b and 104b on resilient member 100 are situated in resilient member retaining holes 202c and 204c, respectively. Resilient member retaining clips 202b engage arm 102 and resilient member retaining clips 204b engage arm 104 to couple resilient member 100 with carrier frame 200. With resilient member 100 coupled to carrier frame 200 and arms 102 and 104 on resilient member 100 urged parallel to each other, the arms 202 and 204 on carrier frame 200 are biased towards each other, transmitting the component retaining force F provided by the arms 102 and 104 on resilient member 100. In an exemplary embodiment, the carrier frame 200 may be made of a resilient material which allows the carrier frame 200 to exert the component retaining force F without the resilient member 100.

Referring now to FIGS. 3a, 3b, 3c, 4a, 4b, 6a and 6b, in component assembly operation, the component 300 is brought towards the carrier frame 200 and resilient member 100 combination. Arm 202 is urged in a direction A and arm 204 is urged in a direction B and component 300 is moved in a direction C and situated between arms 202 and 204 such that arm 202 is adjacent side surface 302c on component 300 and arm 204 is adjacent side surface 302b on component 300. Locating holes 304 on side surface 302c are lined up with locating pegs 202f on arm 202, and locating holes 304 on side surface 302b are lined up with locating pegs 204e on arm 204. The arms 202 and 204 are then released from being urged in directions A and B, respectively, and allowed to transmit component retaining force F from resilient member 100 which causes the locating pegs 202f and 204e on arms 202 and 204, respectively, to engage the locating holes 304 on component 300, and carrier frame 200 to couple to component 300. With carrier frame 200 coupled to component 300, connector 306 is situated in connector channel 206a.

Figure 7A:
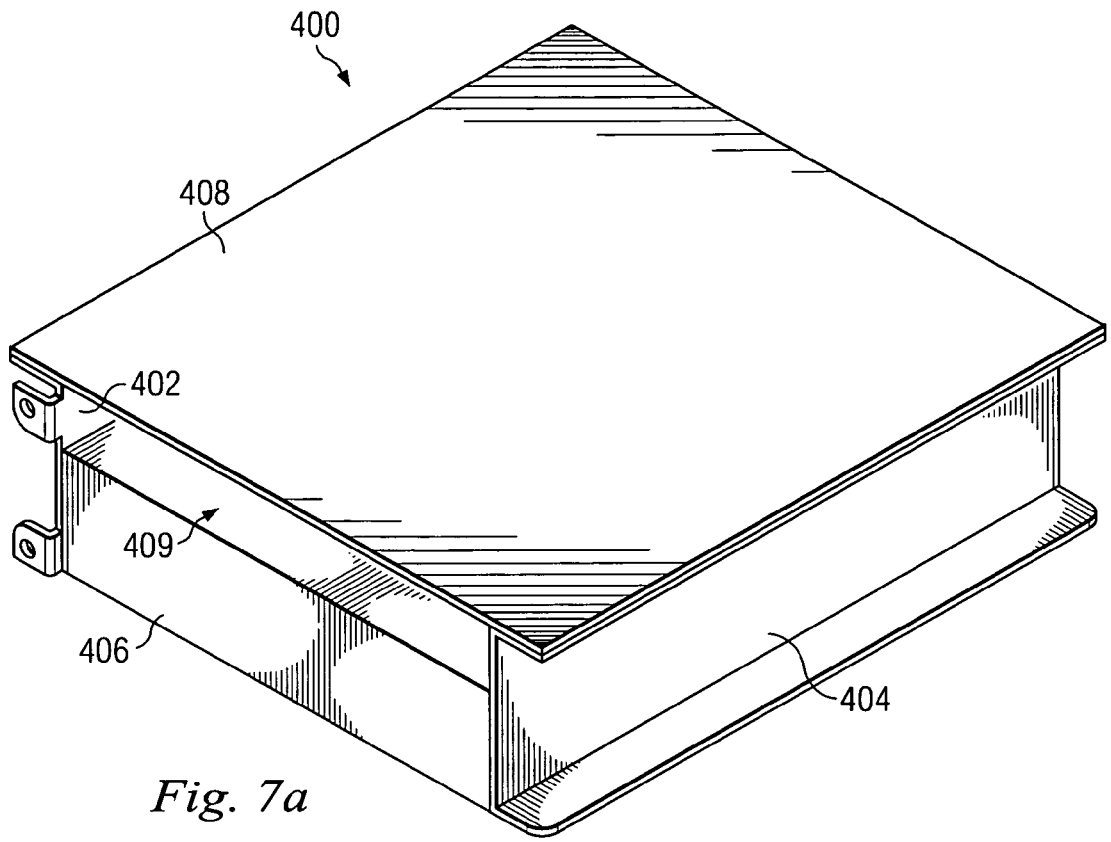
FIG. 7a is a perspective view illustrating an embodiment of a chassis used with the assembled component, carrier frame, and resilient member of FIG. 6b.
Figure 7B:
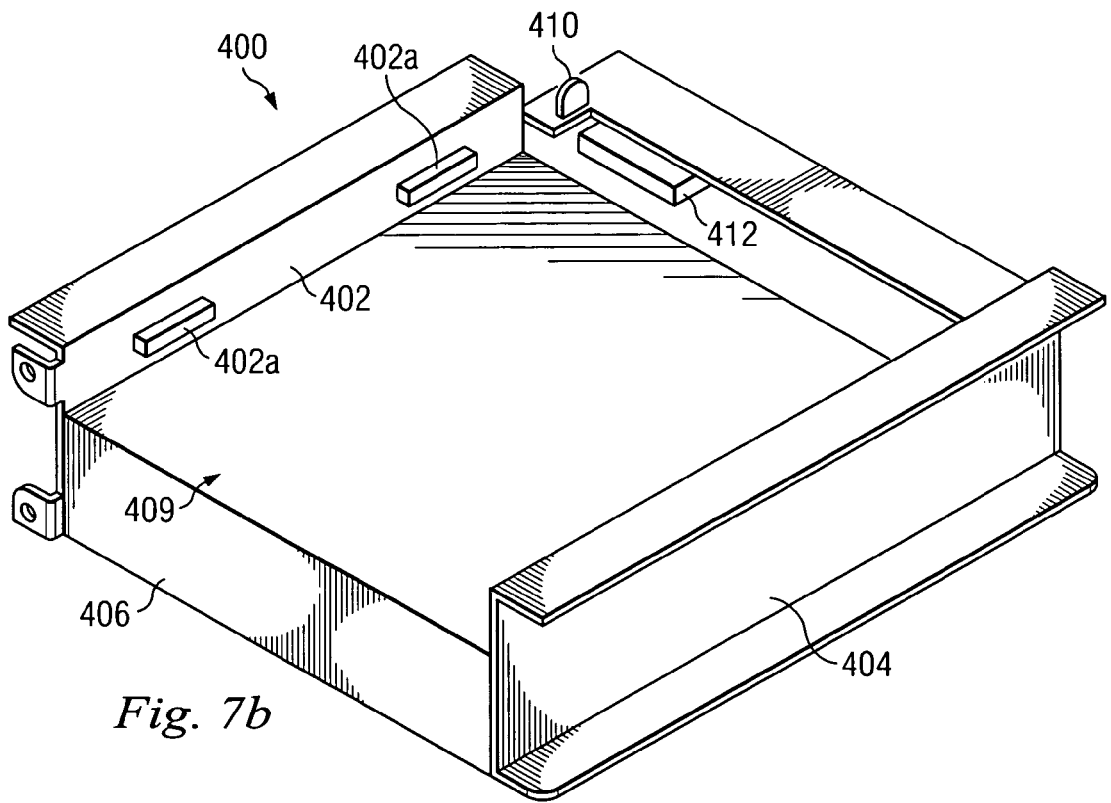
FIG. 7b is a perspective view illustrating an embodiment of the chassis of FIG. 7a with the top portion cut away.
Figure 8B:
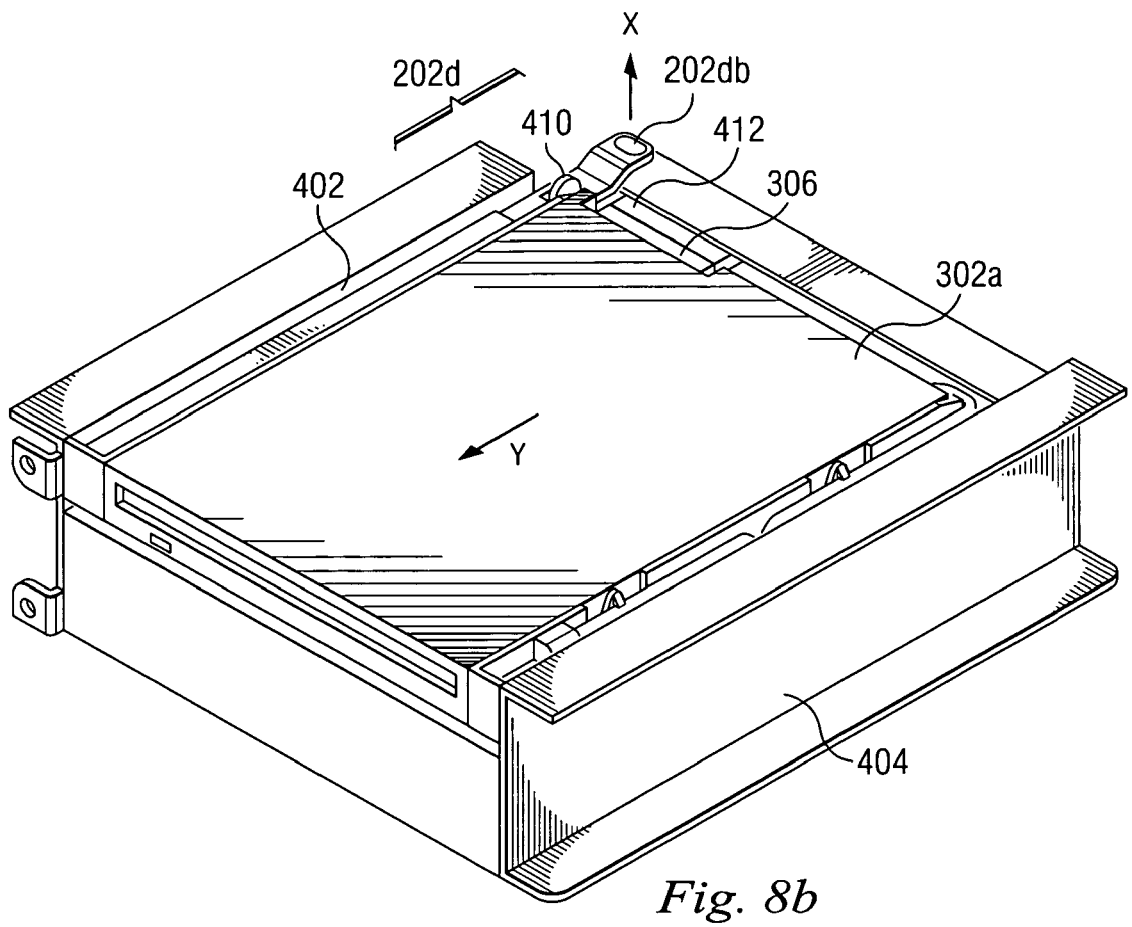
FIG. 8b is a perspective view illustrating an embodiment of the component, carrier frame, and resilient member of FIG. 6b and the chassis of FIG. 7a assembled.

Referring now to FIGS. 7a, 7b, and 7c, an alternative embodiment of an apparatus for installing a component in an information handling system is substantially identical in design and operation to the apparatus described above with reference to FIGS. 1, 2, 3a, 3b, 3c, 4a, 4b, 5a, 5b, 5c, 5d, 6a, and 6b with the addition of a chassis 400. Chassis 400 includes a plurality of support walls 402 and 404 spaced apart and coupled to each other by a base 406. A top portion 408 is coupled to and spans the support walls 402 and 404 and, along with the supports walls 402 and 404 and the base 406, defines a component channel 409 in the chassis 400. A plurality of guide ledges 402a extend from the support wall 402 and into the component channel 409. A plurality of guide ledges 404a extend from the support wall 404 and into the component channel 409. A latch locking member 410 is situated at the rear of channel 409. A connection 412 is situated at the rear of channel 409.

Referring now to FIGS. 3a, 3b, 3c, 7a, 7b, 7c, 8a, and 8b, in operation, the component 300 and carrier frame 200 are brought towards the component channel 409 on chassis 400. Arm 202 on carrier frame 200 is situated adjacent support wall 402, and arm 204 on carrier frame 200 is situated adjacent support wall 404. The frame 200 and component 300 are moved in a direction D and chassis guide member 202a is engaged with guide ledges 402a while chassis guide member 204a is engaged with the plurality of guide ledges 404a. With the chassis guide members 202a and 204a engaged with their respective guide ledges 402a and 404a, connector 306 on component 300 is lined up with connection 412 on chassis 400. The carrier frame 200 and component 300 may then slide on guide ledges 402a and 404a in direction D into component channel 409 until latch 202d reaches the rear of component channel 409. When latch 202d reaches the rear of component channel 409 and engages latch locking member 410. Further movement of the carrier frame 200 in direction D will cause latch locking member 410 to be situated in latching hole 202da. With latch locking member 410 situated in latching hole 202da, connector 306 and connection 412 become matingly engaged and the component 300 is coupled to and secured in the chassis 400. With the component 300 coupled to the chassis 400, the top surface 302a of component 300 may engage the top portion 408 of chassis 400. In an exemplary embodiment, the latch 202d may be made of a resilient material which allows the latch 202d to flex around the latch locking member 410 in order to situated the latch locking member 410 in the latching hole 202da. In an exemplary embodiment, the latch locking member 410 may be moveably mounted in the chassis 400 and will move around the latch 202d as it contacts the latch locking member 410 in order to situate the latch locking member 410 in the latching hole 202da. In releasing operation, the release handle 202db is urged in a direction X such that the latching locking member 410 is situated outside the latching hole 202da and the carrier frame 200 with component 300 is translated in a direction Y and removed from the chassis 400.

Figure 9:
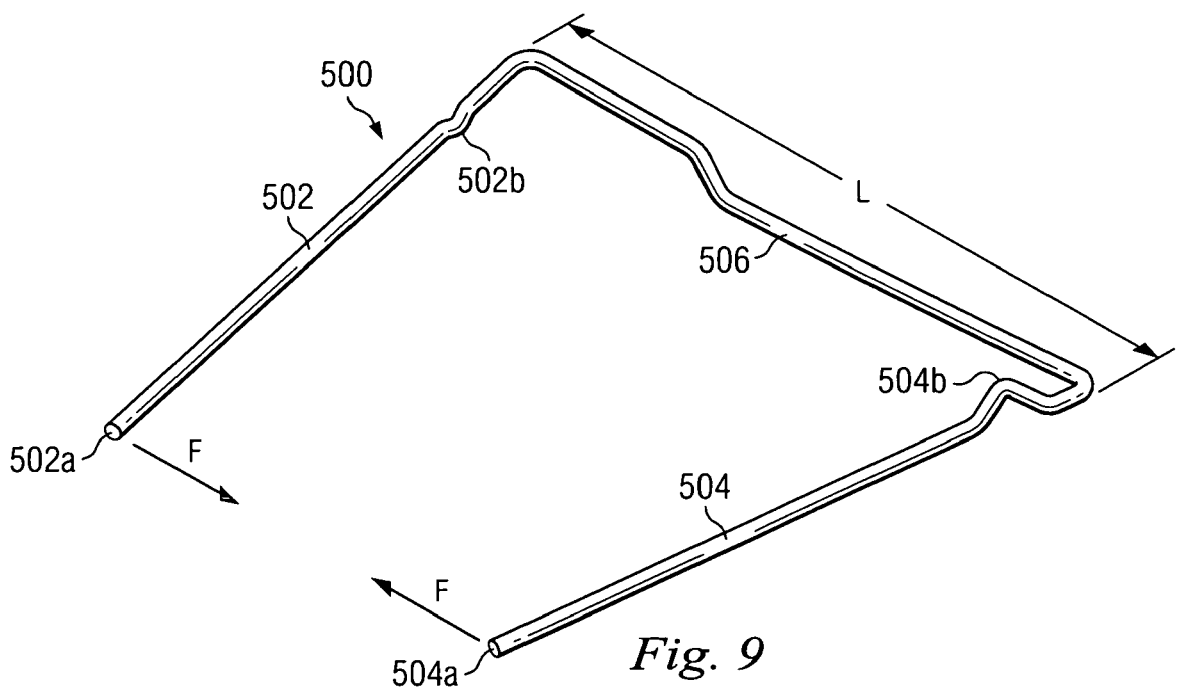
FIG. 9 is a perspective view illustrating an embodiment of a resilient member.

Referring now to FIG. 9, an alternative embodiment of an apparatus for installing a component in an information handling system is illustrated which includes a resilient member 500. Resilient member 500 includes a plurality of arms 502 and 504 which are spaced apart and coupled together by a base 506 with length L. Arm 502 includes a distal end 502a opposite the base 506 and a chassis securing portion 502b situated between the base 506 and the distal end 502a. Arm 504 includes a distal end 504a opposite the base 506 and a chassis securing portion 504b situated between the base 506 and the distal end 504a. The distance between distal arms 502a and 504a is less than the length L of the base 506 such that when arms 502 and 504 are urged parallel to each other, arms 502 and 504 may provide a component retaining force F directed towards each other.

Figure 10A:
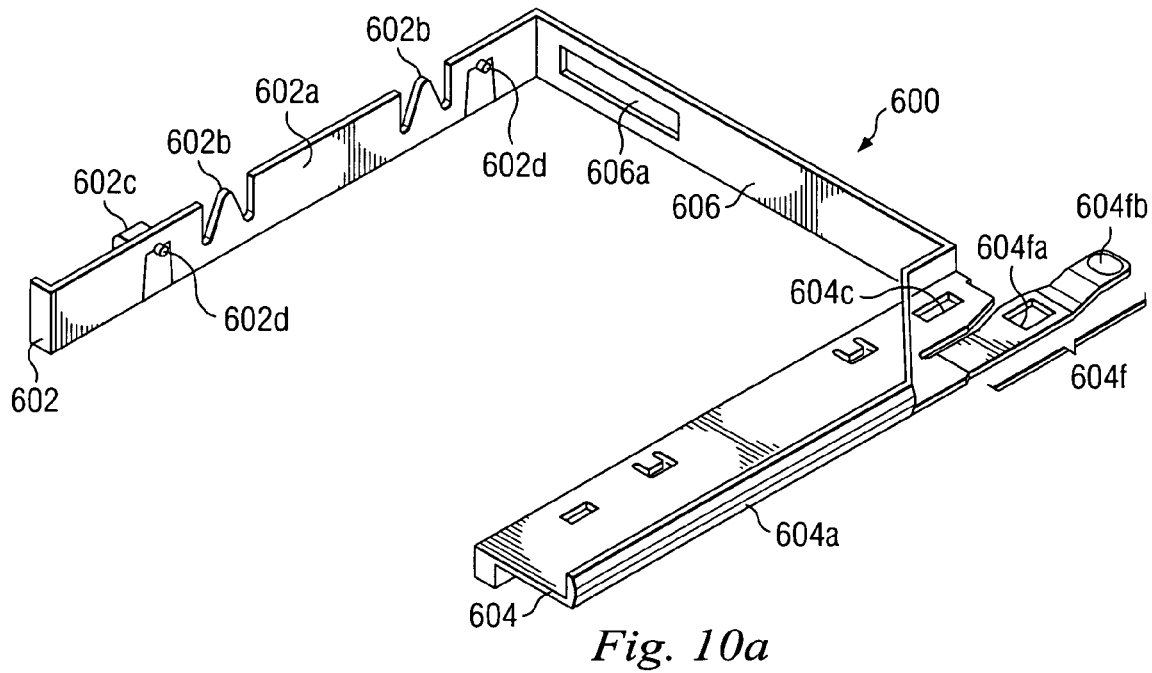
FIG. 10a is a front perspective view illustrating an embodiment of a carrier frame used with the resilient member of FIG. 9.
Figure 10B:
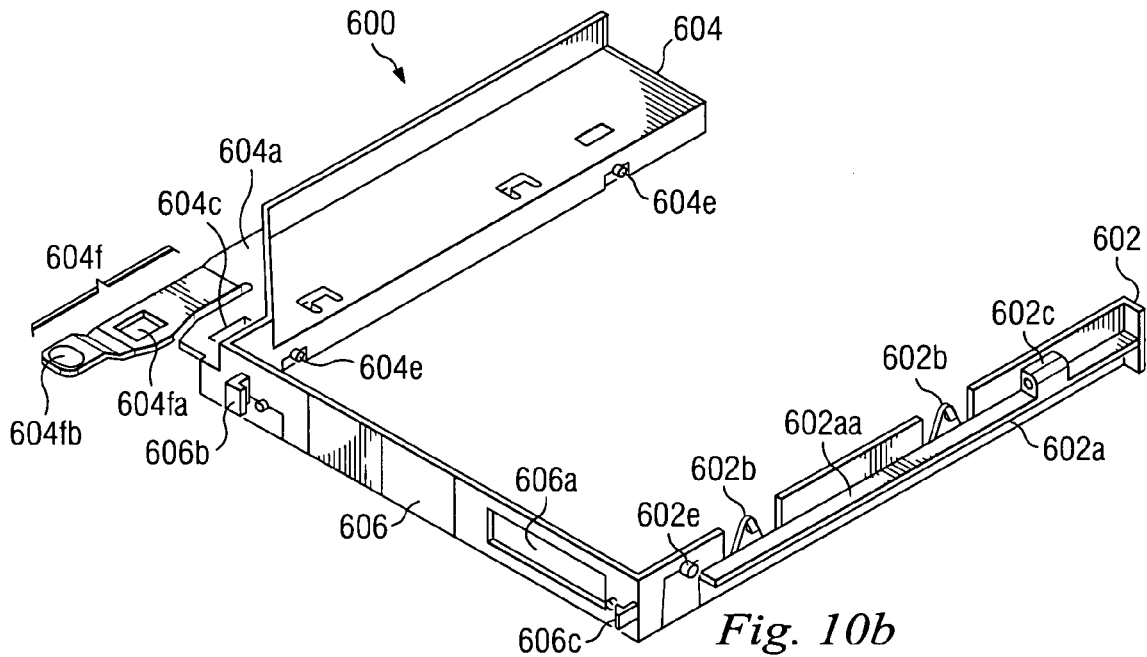
Figure 10C:
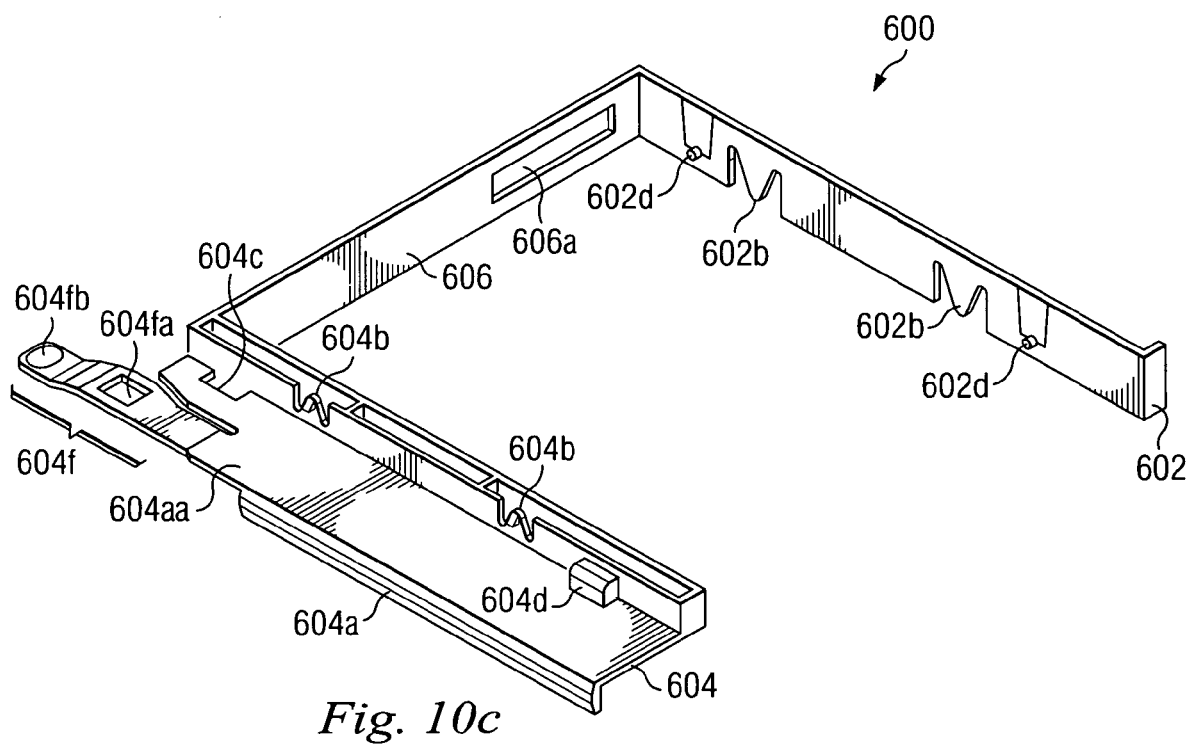

Referring now to FIGS. 10a, 10b, and 10c, a carrier frame 600 includes a plurality of arms 602 and 604 spaced apart substantially parallel to each other and coupled together by a base 606. A component channel is defined between the arms 602 and 604 and the base 606. The base 606 defines a connector channel 606a adjacent arm 602 and includes a plurality of adapter retention clips 606b and 606c on opposite sides of the connector channel 606a. Arm 602 includes a chassis guide member 602a situated along its length. The chassis guide member 602a includes a top surface 602aa. A plurality of resilient member retaining clips 602b extend from arm 602 and are situated adjacent the top surface 602*aa* of chassis guide member 602*a*. A resilient member securing member 602*c* is situated on top surface 602*aa* of arm 602 and on the end of arm 202 opposite the base 606. A plurality of component locating pegs 602*d* extend from arm 602. A resilient member securing portion 602*e* extends from arm 602 and is situated adjacent the base 606.

Arm 604 includes a chassis guide member 604*a* situated along its length. The chassis guide member 604*a* includes a bottom surface 604*aa*. A plurality of resilient member retaining clips 604*b* extend from arm 604 and are situated adjacent the bottom surface 604*aa* of chassis guide member 604*a*. Arm 604 defines a resilient member mounting hole 604*c* situated adjacent the base 606 and extending through chassis guide member 604*a*. A resilient member securing member 604*d* is situated on bottom surface 604*aa* of arm 604. A plurality of component locating pegs 604*e* extend from arm 604. A latch 604*f* extends from arm 604 and out past base 606 and defines a latching hole 604*fa* and includes a release handle 604*fb*.

Figure 11:
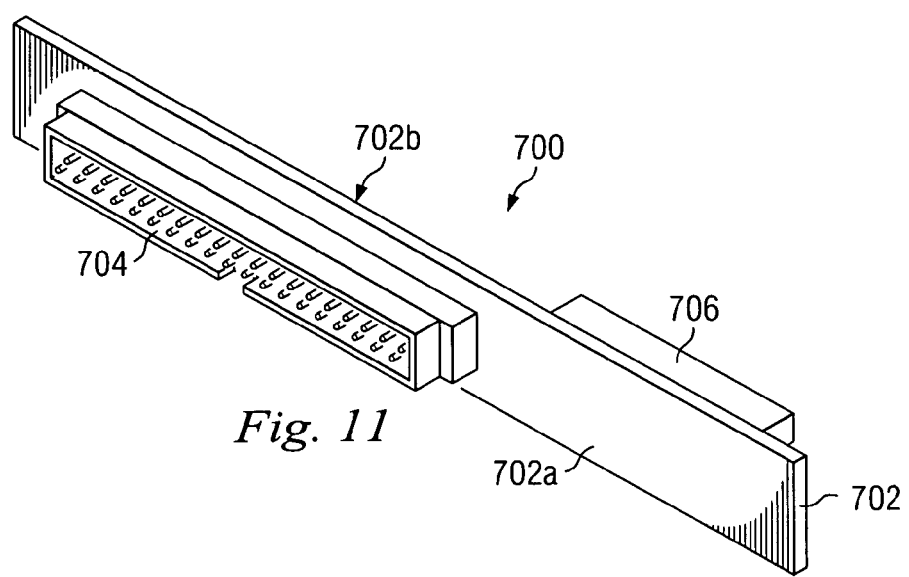

Referring now to FIG. 11, a connection adapter 700 includes a base 702 with a front surface 702*a* and a rear surface 702*b* opposite the front surface 702*a*. A system connection 704 extends from the front surface 702*a*. A component connection 706 is coupled to the system connection 704 and extends from the rear surface 702*b* on connection adapter 700.

Figure 12A:
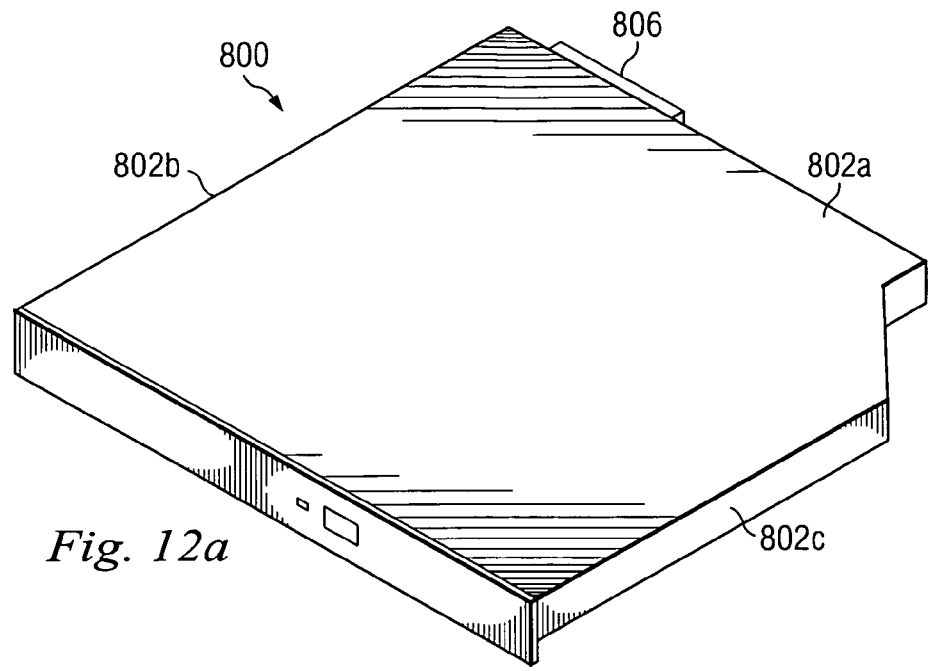
Figure 12B:
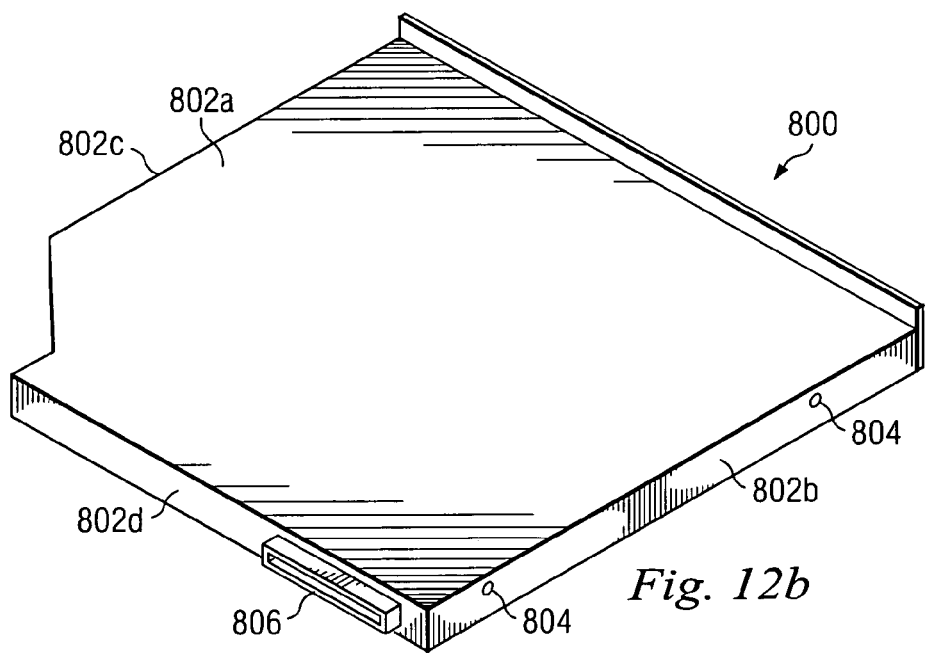
Figure 12C:
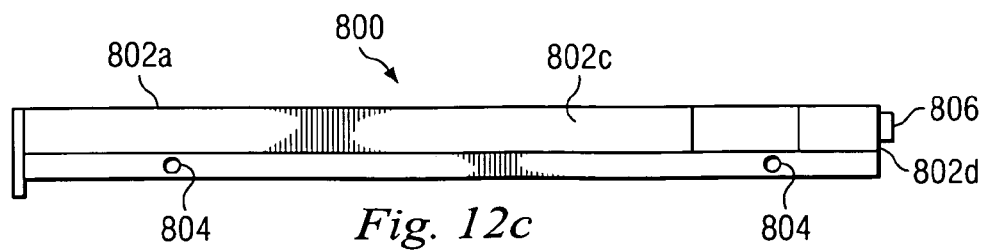
Figure 13A:
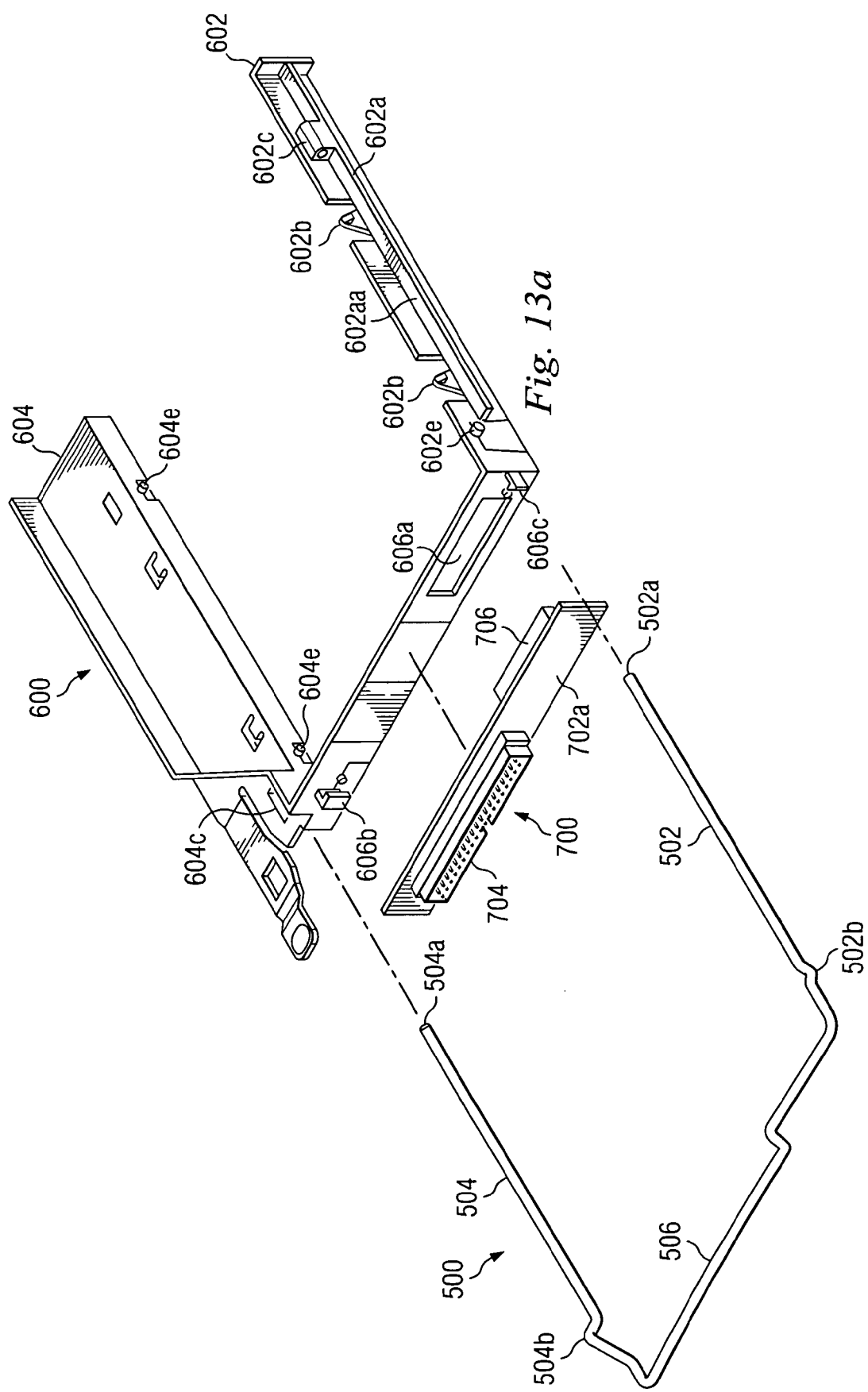
FIG. 13a is a perspective view illustrating an embodiment of an assembly of the resilient member of FIG. 9 with the carrier frame of FIG. 10a and the connection adapter of FIG. 11.
Figure 13B:
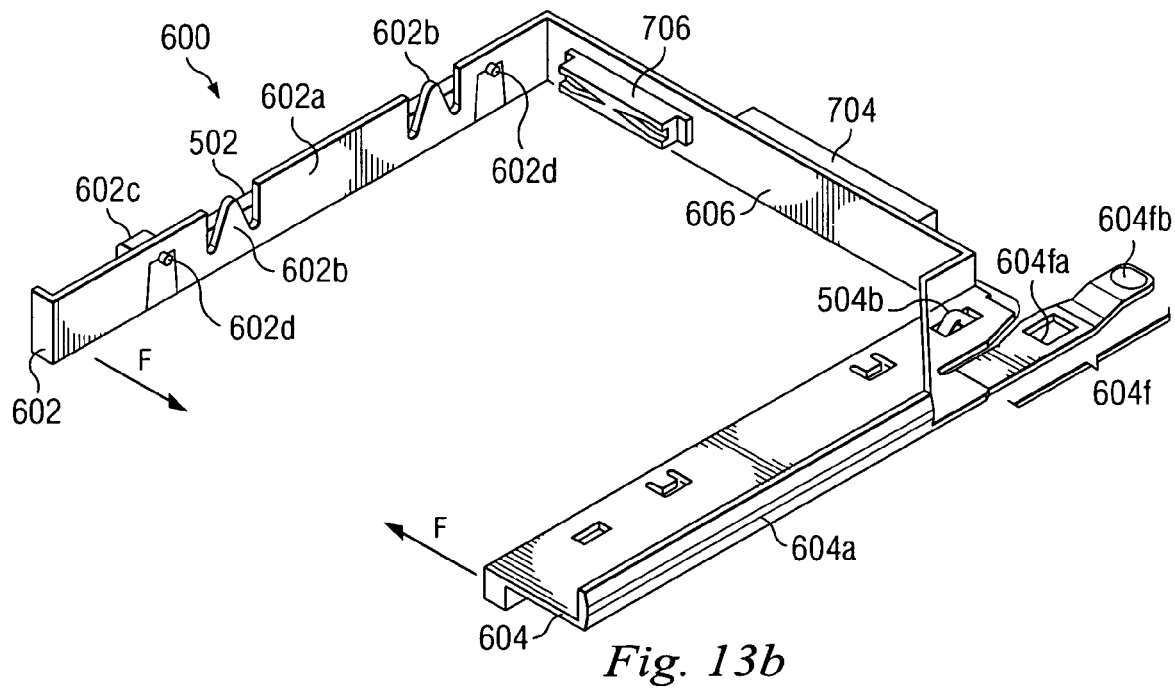
FIG. 13b is a front perspective view illustrating an embodiment of the resilient member of FIG. 9, the carrier frame of FIG. 10a, and the connection adapter of FIG. 11 assembled.
Figure 13C:
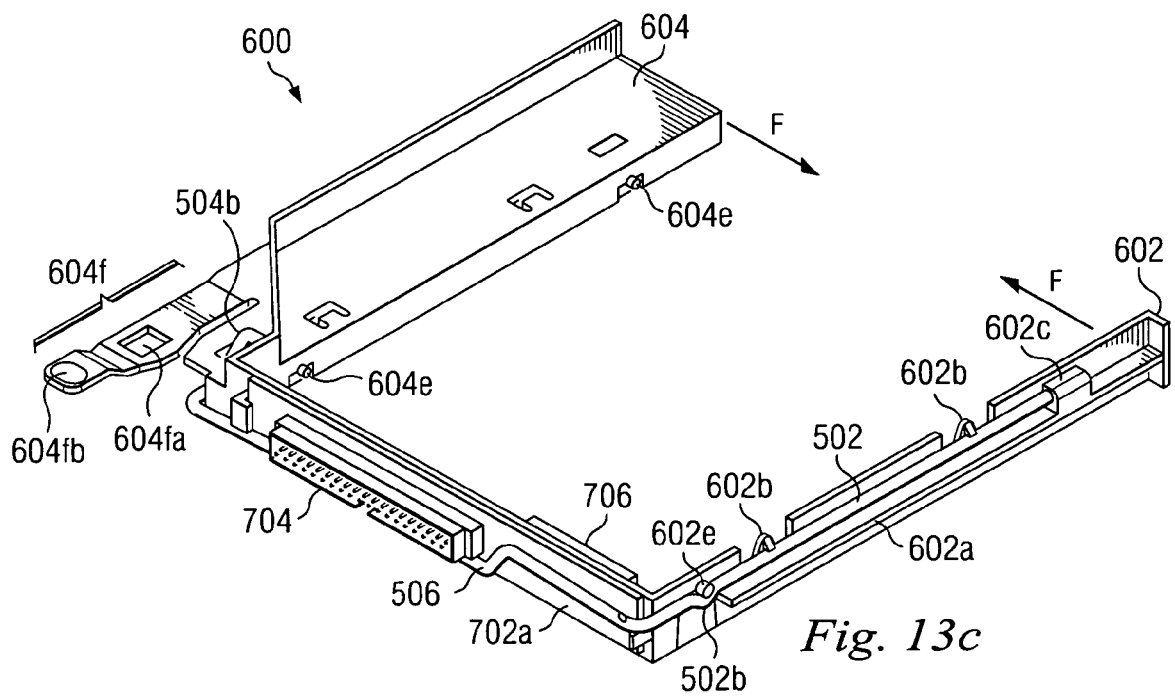
FIG. 13c is a rear perspective view illustrating an embodiment the resilient member, carrier frame, and connection adapter of FIG. 13b.
Figure 13D:
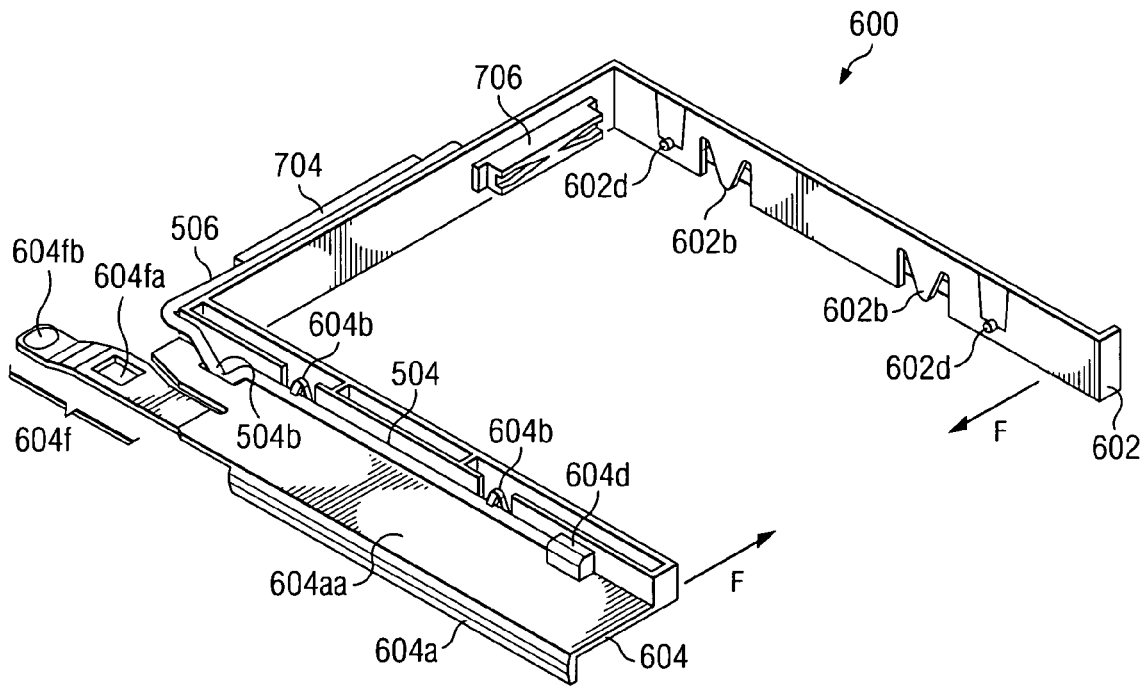
FIG. 13d is a bottom perspective view illustrating an embodiment the resilient member, carrier frame, and connection adapter of FIG. 13b.
Figure 14B:
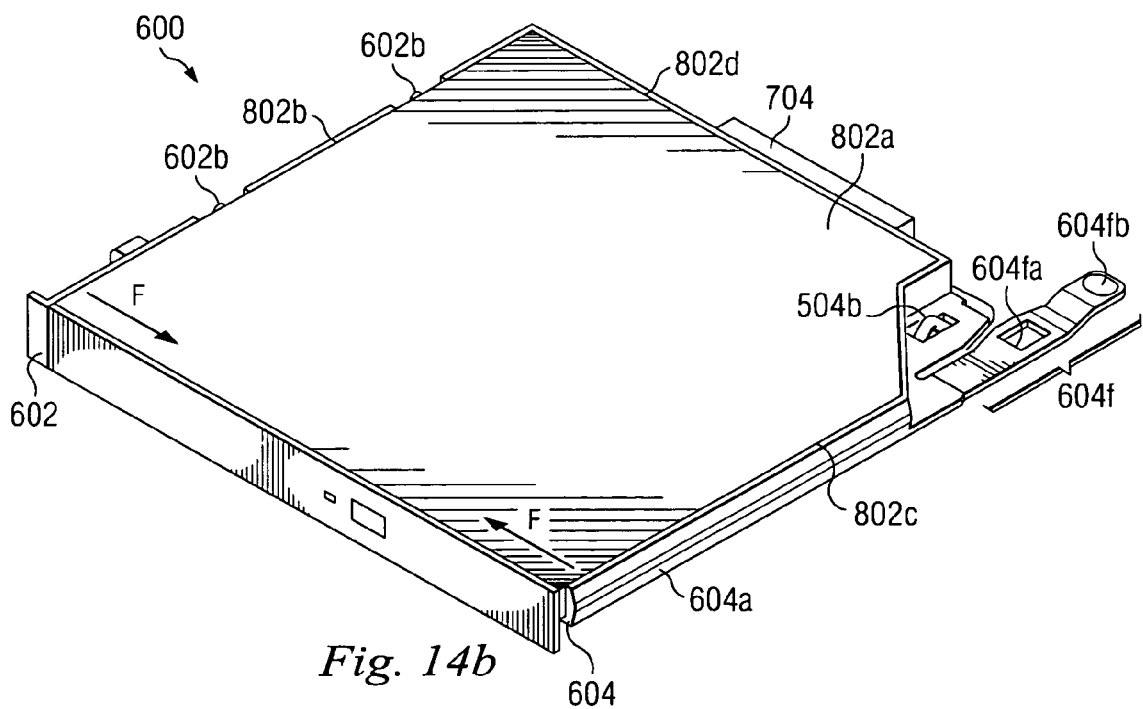
FIG. 14b is a perspective view illustrating an embodiment of the component of FIG. 12a and the resilient member, carrier frame, and connection adapter of FIG. 13b assembled.
Figure 14A:
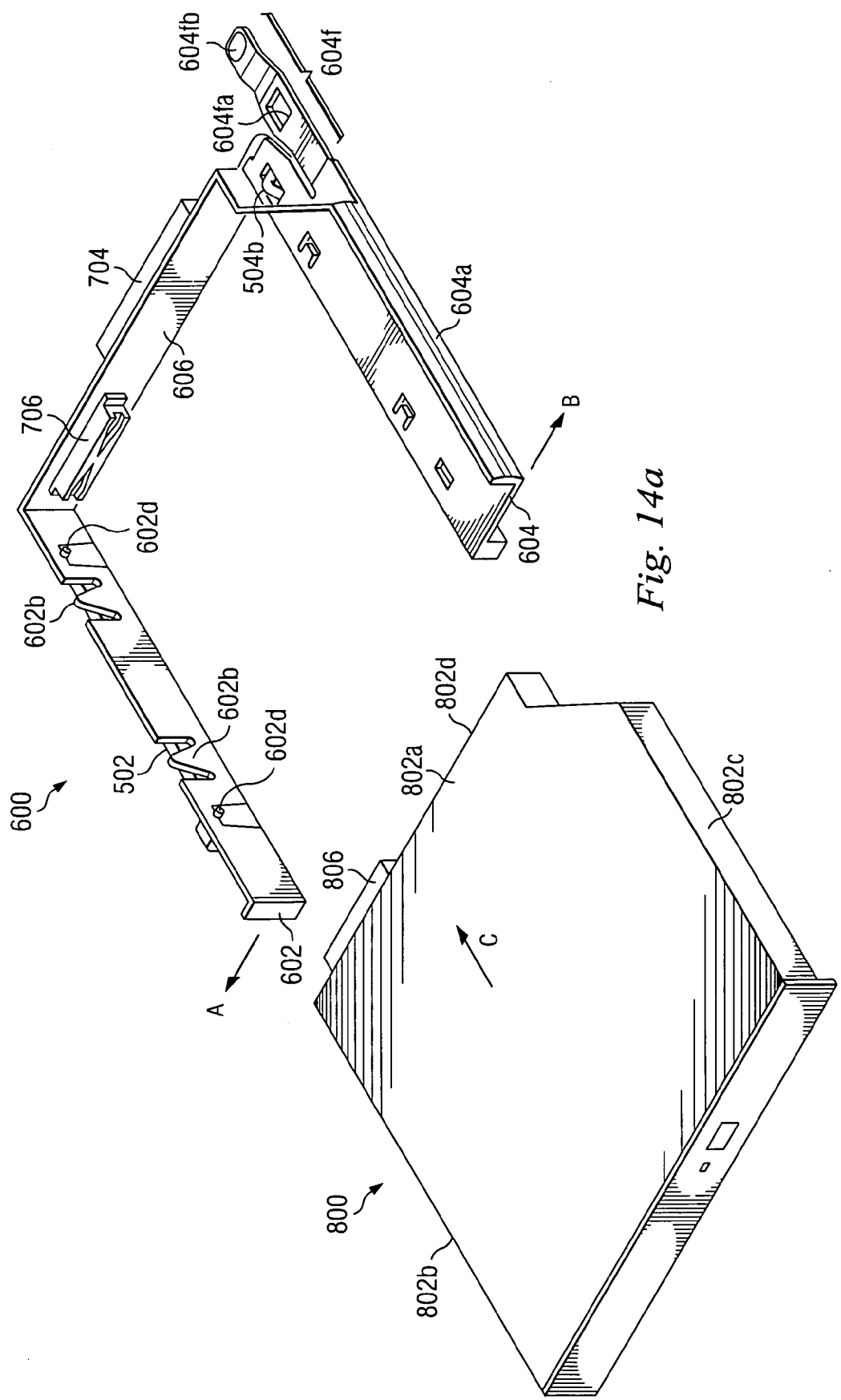
FIG. 14a is a perspective view illustrating an embodiment of the assembly of the component of FIG. 12a and the assembled resilient member, carrier frame, and connection adapter of FIG. 13b.

Referring now to FIGS. 12*a*, 12*b*, and 12*c* a component 800 includes a top surface 802*a*, a side surface 802*b*, and a side surface 802*c*, and a rear surface 802*d*. In an embodiment, the side surfaces 802*b* and 802*c* are a portion of a perimeter surface of the component 800. The component 800 defines a plurality of locating holes 804 situated on opposites ends of side surfaces 802*b* and 802*c*. A connector 806 is situated on rear surface 802*d*. In an exemplary embodiment, the component 800 may be a compact disk drive or other equivalent drives known in the art.

Referring now to FIGS. 13*a*, 13*b*, 13*c*, and 13*d*, in apparatus assembly operation, connection adapter 700 is brought towards the base 606 such that component connector 706 is lined up with connector channel 606*a*. The connection adapter 700 is then coupled to the base 606 by situating it between adapter retention clips 606*b* and 606*c*. With connection adapter 700 coupled to the base 606, the component connector 706 is located in connector channel 606*a*. Arms 502 and 504 on resilient member 500 are then urged parallel to each other and resilient member 500 is brought towards carrier frame 600. Arm 502 on resilient member 500 is lined up with arm 602 on carrier frame 600, and arm 504 on resilient member 500 is lined up with arm 604 on carrier frame 600. Arm 502 is then situated adjacent top surface 602*aa* of chassis guide member 602*a* and arm 504 is situated adjacent bottom surface 604*aa* on chassis guide member 604*a* and the resilient member 500 is engaged with the carrier frame 600 such that distal end 502*a* of arm 502 is secured in resilient member securing member 602*c* and distal end 504*a* of arm 504 is secured in resilient member securing member 604*d*. With distal members 502*a* and 504*a* secured in resilient member securing members 602*c* and 604*d*, chassis securing portion 504*b* is situated in resilient member retaining holes 604*c* and chassis securing portion 502*b* is situated around resilient member securing portion 602*e*. Resilient member retaining clips 602*b* engage arm 502 and resilient member retaining clips 604*b* engage arm 504 to couple resilient member 500 with carrier frame 600. Base 506 on resilient member 500 engages front surface 702*a* on connection adapter 700 to further secure it to carrier frame 600. With resilient member 500 coupled to carrier frame 600 and arms 502 and 504 on resilient member 500 urged parallel to each other, the arms 602 and 604 on carrier frame 600 are biased towards each other, transmitting the component retaining force F provided by arms 502 and 504 on resilient member 500. In an exemplary embodiment, the carrier frame 600 may be made of a resilient material which allows the carrier frame 600 to exert the component retaining force F without the resilient member 500.

Referring now to FIGS. 10*a*, 10*b*, 10*c*, 11, 12*a*, 12*b*, 12*c*, 14*a* and 14*b*, in component assembly operation, the component 800 is brought towards the carrier frame 600 and resilient member 500 combination. Arm 602 is urged in a direction A and arm 604 is urged in a direction B and component 800 is moved in a direction C and situated between arms 602 and 604 such that arm 602 is adjacent side surface 802*b* on component 800 and arm 604 is adjacent side surface 802*c* on component 800. Locating holes 804 on side surface 802*b* are lined up with locating pegs 602*d* on arm 602, and locating holes 804 on side surface 802*c* are lined up with locating pegs 604*e* on arm 604. The arms 602 and 604 are then released from being urged in directions A and B, respectively, and allowed to exert component retaining force F which causes the locating pegs 602*d* and 604*e* on arms 602 and 604, respectively, to engage the locating holes 804 on component 800 and carrier frame 600 to couple to component 800. With carrier frame 600 coupled to component 800, connector 806 is matingly engaged with component connection 706.

Figure 15A:
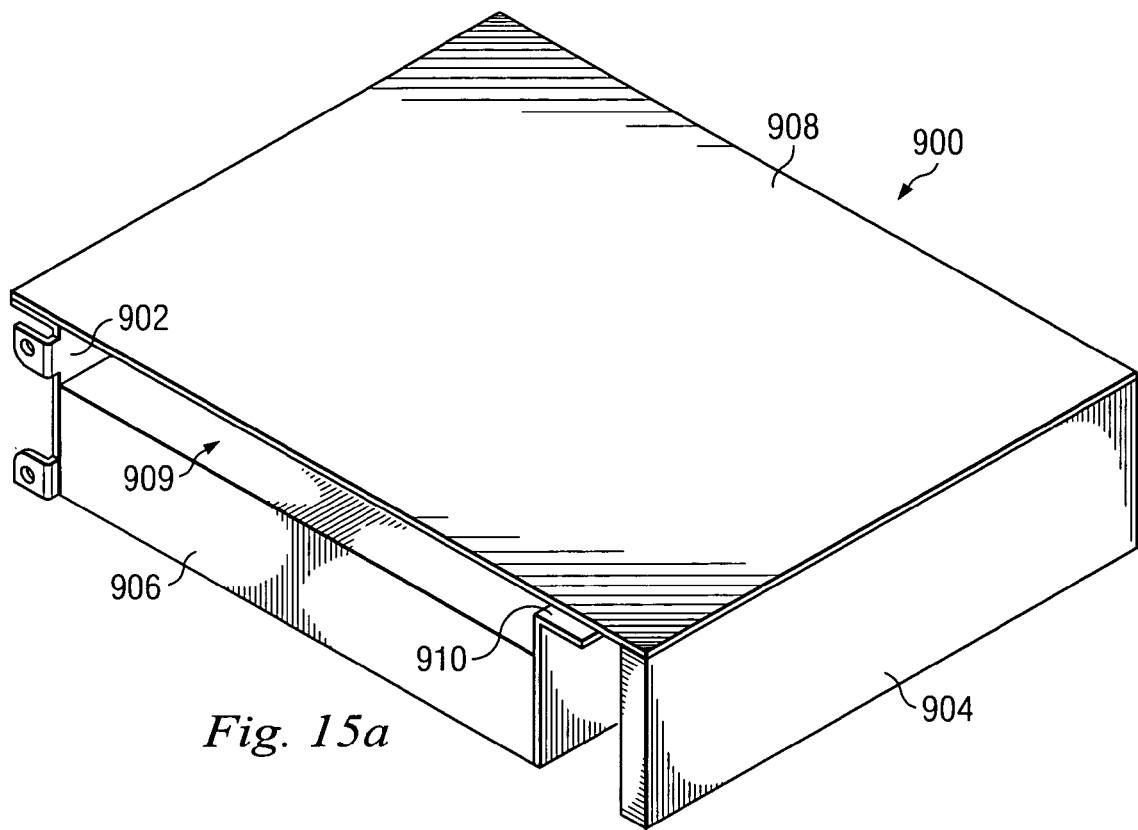
FIG. 15a is a perspective view illustrating an embodiment of a chassis used with the assembled component, carrier frame, connection adapter, and resilient member of FIG. 13b.
Figure 15B:
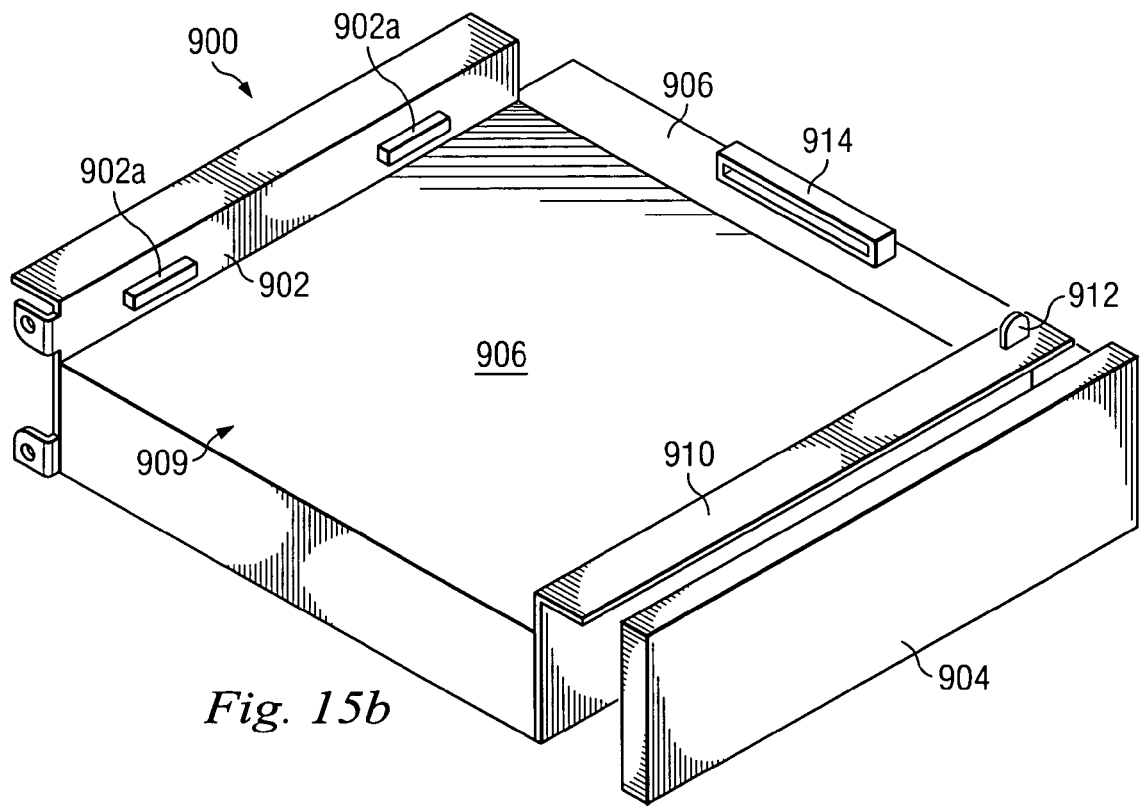
FIG. 15b is a perspective view illustrating an embodiment of the chassis of FIG. 15a with the top portion cut away.
Figure 16A:
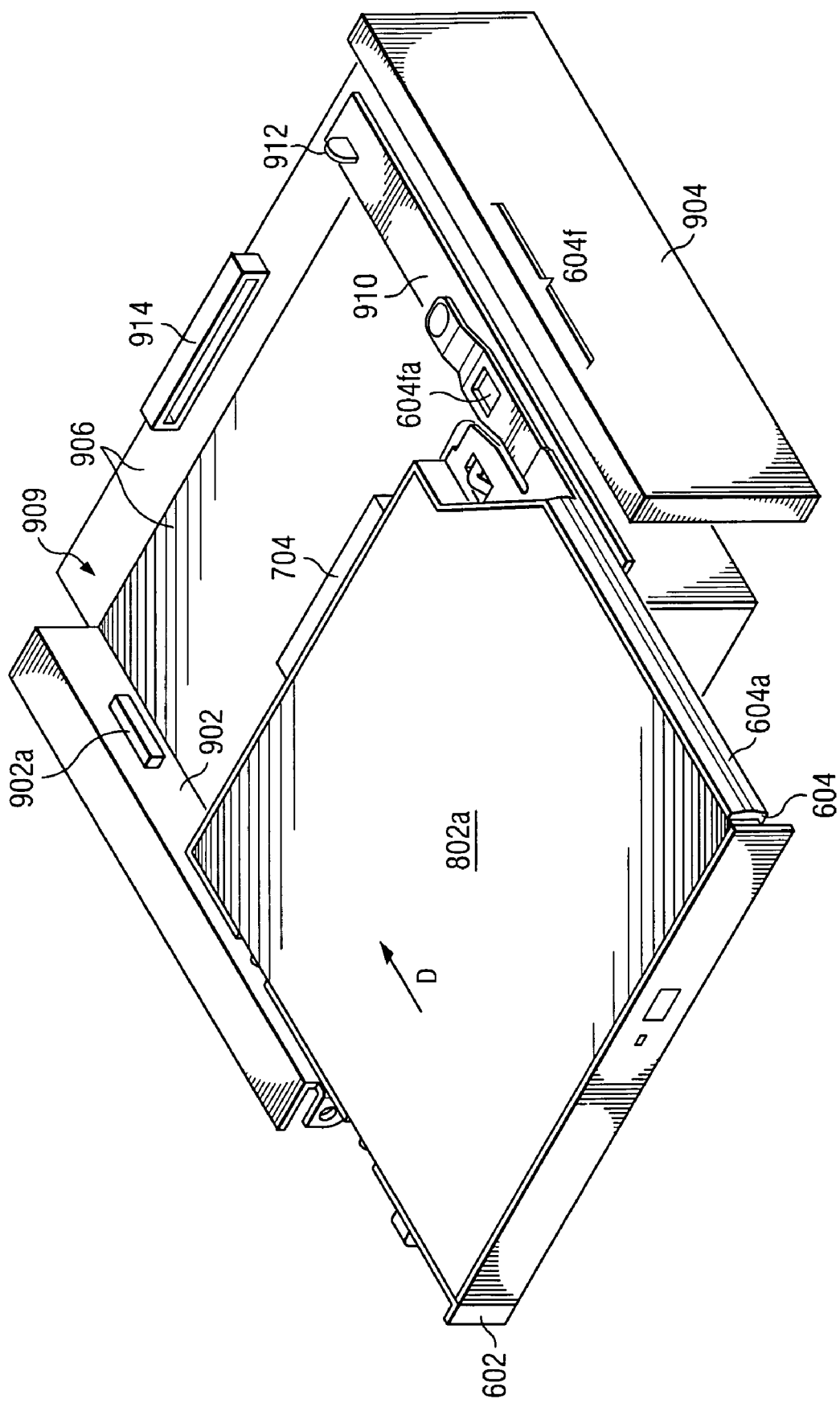
Figure 16B:
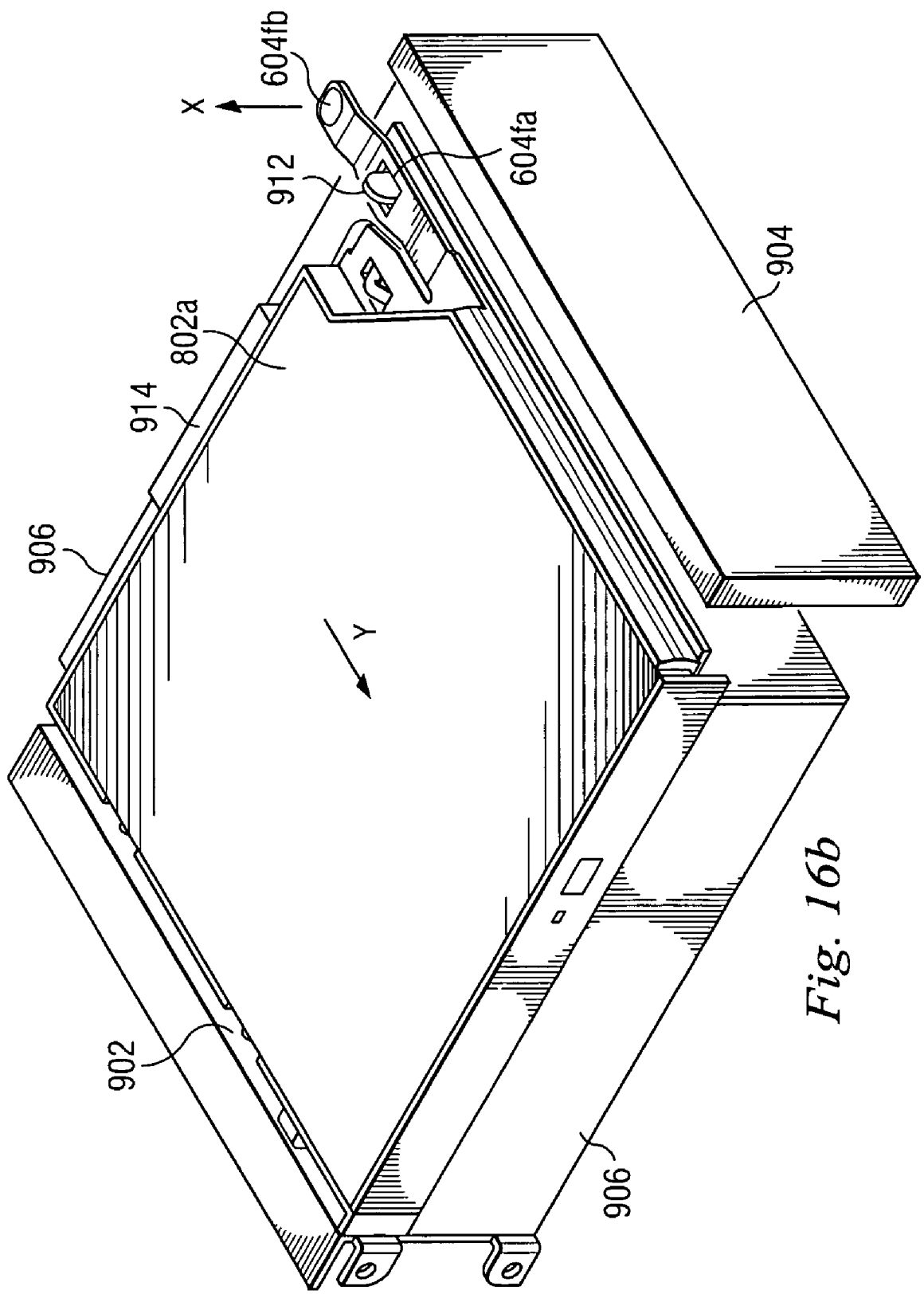
FIG. 16b is a perspective view illustrating an embodiment of the component, carrier frame, resilient member, and connection adapter of FIG. 14b and the chassis of FIG. 15a assembled.

Referring now to FIGS. 15*a* and 15*b*, an alternative embodiment of an apparatus for installing a component in an information handling system is substantially identical in design and operation to the apparatus described above with reference to FIGS. 9, 10*a*, 10*b*, 10*c*, 11, 12*a*,12*b*, 12*c*, 13*a*, 13*b*, 13*c*, 13*d*, 14*a*, and 14*b* with the addition of a chassis 900. Chassis 900 includes a plurality of support walls 902 and 904 spaced apart and coupled to each other by a base 906. A top portion 908 is coupled to and spans the support walls 902 and 904 and, along with the supports walls 902 and 904 and the base 906, defines a component channel 909 in the chassis 900. A plurality of guide ledges 902*a* extend from the support wall 902 and into the component channel 909. A guide ledge 910 is situated adjacent the support wall 904 and the component channel 909. A latch locking member 912 is situated at an end of the guide ledge 910. A connection 914 is situated at the rear of channel 909 and adjacent the latch locking member 912.

Referring now to FIGS. 10*a*, 10*b*, 10*c*, 15*a*, 15*b*, 16*a*, and 16*b*, in operation, the carrier frame 600 and resilient member 500 combination coupled to component 800 is brought towards the component channel 909 on chassis 900. Arm 602 on carrier frame 600 is situated adjacent support wall 902, and arm 604 on carrier frame 600 is situated adjacent support wall 904. The frame 600 and component 800 are moved in a direction D and chassis guide member 602*a* is engaged with guide ledges 902*a* while chassis guide member 604*a* is engaged with guide ledge 910. With the chassis guide members 602*a* and 604*a* engaged with their respective guide ledges 902*a* and 910, system connection 704 is lined up with connection 914 on chassis 900. The carrier frame 600 and component 800 may then slide on guide ledges 902*a* and 910 in direction D into component channel 909 until latch 604*f* reaches the rear of component channel 909. When latch 604*f* reaches the rear of component channel 909, the latch 604*f* engages latch locking member 912. Further movement of the carrier frame 600 in direction D will cause latch locking member 912 to be situated in latching hole 604*fa*. With latch locking member 912 situated in latching hole 604*fa*, system connection 704 and connection 914 become matingly engaged and the component 800 is coupled to and secured in the chassis 900. With the component 800 coupled to the chassis 900, the top surface 802a of component 800 may engage the top portion 908 of chassis 900. In an exemplary embodiment, the latch 604f may be made of a resilient material which allows the latch 604f to flex around the latch locking member 912 in order to situated the latch locking member 912 in the latching hole 604fa. In an exemplary embodiment, the latch locking member 912 may be moveably mounted in the chassis 900 and will move around the latch 604 as it contacts the latch locking member 912 in order to situated the latch locking member 912 in the latching hole 604fa. In releasing operation, the release handle 604fb is urged in a direction X such that the latching locking member 912 is situated outside the latching hole 604fa and the carrier frame 600 with component 800 is translated in a direction Y and removed from the chassis 900.

It is understood that variations may be made in the foregoing without departing from the scope of the disclosed embodiments. Furthermore, the elements and teachings of the various illustrative embodiments may be combined in whole or in part some or all of the illustrative embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A component carrier apparatus comprising:
a resilient carrier frame comprising a base and defining a component channel between a plurality of arms of similar length that extend from opposing ends of the base, wherein at least one of the plurality of arms is resiliently biased towards the component channel in order to provide a component retaining force that is directed towards the component channel such that the plurality of arms are urged into a parallel orientation to each other and directly engage a perimeter surface of a component when the component is located in the component channel;
a chassis guide member located on each arm; and
a component locating member located on at least one arm.

2. The apparatus of claim 1 wherein the resilient carrier frame comprises a resilient member biasing the arms towards the component channel.

3. The apparatus of claim 1 wherein the chassis guide member comprises a plurality of surfaces situated on opposite sides of the resilient carrier frame.

4. The apparatus of claim 1 wherein the component locating member base and the plurality of arms are a one-piece, U,shaped member.

5. The apparatus of claim 1 further comprising:
a latch connected to the resilient carrier frame, the latch operable to engage an IHS chassis to secure the resilient carrier frame to the IHS chassis.

6. The apparatus of claim 5 wherein the latch comprises a release handle that is operable to disengage the latch from the IHS chassis.

7. The apparatus of claim 1 further comprising:
a connection adapter coupled to the resilient carrier frame, the connection adapter comprising a component connection that is offset from a system connection such that a component that is coupled to the resilient carrier frame and electrically coupled to the component connection may be electrically coupled to an IHS through the system connection.

8. The apparatus of claim 1 further comprising:
a component located in the component channel between the arms and coupled to the component carrier apparatus such that the arms provide the component retaining force to the perimeter surface of the component, the component exhibiting a maximum height which is at least equal to the maximum height of the resilient carrier frame.

9. A computer system comprising: a system component comprising a perimeter surface; a carrier frame comprising a base and defining a component channel between a plurality of arms of similar length that extend from opposing ends of the base, wherein the system component is located in the component channel between the arms; a resilient member coupled to the carrier frame and biasing at least one of the plurality of arms towards the component channel such that a component retaining force is provided through the direct engagement of the plurality of arms and the perimeter surface of the system component to couple the carrier frame to the system component; and urged the plurality of arms into a parallel orientation to each other a chassis guide member located on each arm.

10. The system of claim 9 wherein the carrier base and the plurality of arms are a one-piece, U-shaped member.

11. The system of claim 9 further comprising: at least one component locating member extending from the plurality of arms-that and engaging the system component through the perimeter surface in order to locate the component in the carrier frame.

12. The system of claim 9 further comprising:
a latch connected to the carrier frame.

13. The system of claim 9 further comprising:
a connection adapter coupled to the carrier frame, the connection adapter comprising a component connection that is offset from a system connection, whereby the system component is electrically coupled to the component connection such that the system component may be electrically coupled to an IHS through the system connection.

14. The system of claim 9 wherein the carrier frame comprises a maximum height which is at most equal to the maximum height of the component.

15. An information handling system comprising: a chassis; a microprocessor coupled to the chassis; a storage coupled to the microprocessor; a component coupled to the microprocessor and comprising a perimeter surface; a resilient carrier frame comprising a base and defining a component channel between a plurality of arms of similar length that extend from opposing ends of the base, at least one of the plurality of arms that extend from opposing ends of the base, at least one of the plurality of arms resiliently biased towards the component channel such that component retaining force is provided through the direct engagement of the plurality of arms and the perimeter surface of the component to couple the resilient carrier frame to the component; and urge the plurality of arms into a parallel orientation to each other; and a chassis guide member extending from each arm, the chassis guide members engaging the chassis to couple the component to the chassis.

16. The system of claim 15 wherein the base and the plurality of arms are a one-piece U-shaped member.

17. The system of claim 15 wherein the chassis guide member comprises a plurality of surfaces situated on opposite sides of the resilient carrier frame.

18. The system of claim 15 further comprising:
at least one component locating member extending from the plurality of arms that is operable to engage the component through the perimeter surface in order to locate the component in the resilient carrier frame.

19. The system of claim 15 further comprising:
a latch connected to the resilient carrier frame.

20. The system of claim 15 further comprising:
a connection adapter coupled to the resilient carrier frame, the connection adapter comprising a component connection that is offset from a system connection that is electrically coupled to the microprocessor, whereby the component that is coupled to the resilient carrier frame and electrically coupled to the component connection is electrically coupled to the microprocessor through the system connection.

21. The system of claim 15 wherein the resilient carrier frame comprises a maximum height which is at most equal to the maximum height of the component.

* * * * *

UNITED STATES PATENT AND TRADEMARK OFFICE
CERTIFICATE OF CORRECTION

| | | |
|---|---|---|
| PATENT NO. | : 7,457,110 B2 | |
| APPLICATION NO. | : 10/902900 | |
| DATED | : November 25, 2008 | |
| INVENTOR(S) | : Michael Lo et al. | |

It is certified that error appears in the above-identified patent and that said Letters Patent is hereby corrected as shown below:

Claim 4, Column 9, Lines 53-54, delete "U,shaped" and insert --U-shaped--.

Claim 9, Column 10, Lines 11-25, delete the entire claim 9 and insert new claim 9
--A computer system comprising:
      a system component comprising a perimeter surface;
      a carrier frame comprising a base and defining a component channel between a plurality of arms of similar length that extend from opposing ends of the base, wherein the system component is located in the component channel between the arms;
      a resilient member coupled to the carrier frame and biasing at least one of the plurality of arms towards the component channel such that a component retaining force is provided through the direct engagement of the plurality of arms and the perimeter surface of the system component to couple the carrier frame to the system component and urge the plurality of arms into a parallel orientation to each other; and
      a chassis guide member located on each arm.--

Claim 11, Column 10, Lines 28-32, delete the entire claim 11 and insert new claim 11
--The system of claim 9 further comprising:
      at least one component locating member extending from the plurality of arms and engaging the system component through the perimeter surface in order to locate the component in the carrier frame.--

Claim 15, Column 10, Lines 47-62, delete entire claim 15 and insert new claim 15
--An information handling system comprising:
      a chassis;
      a microprocessor coupled to the chassis;
      a storage coupled to the microprocessor;
      a component coupled to the microprocessor and comprising a perimeter surface;
      a resilient carrier frame comprising a base and defining a component channel between a plurality of arms of similar length that extend from opposing ends of the base, at least one of the plurality of arms that extend from opposing ends of the base, at least the plurality of arms resiliently biased towards the component channel such that a component retaining force is provided through the direct engagement of the plurality of arms and the perimeter surface of the component to couple the resilient carrier frame to the component and urge the plurality of arms into a parallel orientation to each other; and

UNITED STATES PATENT AND TRADEMARK OFFICE
CERTIFICATE OF CORRECTION

PATENT NO.         : 7,457,110 B2
APPLICATION NO.    : 10/902900
DATED              : November 25, 2008
INVENTOR(S)        : Michael Lo et al.

It is certified that error appears in the above-identified patent and that said Letters Patent is hereby corrected as shown below:

a chassis guide member extending from each arm, the chassis guide members engaging the chassis to couple the component to the chassis.--

Signed and Sealed this

Twenty-second Day of December, 2009

David J. Kappos
*Director of the United States Patent and Trademark Office*